(12) United States Patent
Kumano

(10) Patent No.: US 10,601,922 B2
(45) Date of Patent: Mar. 24, 2020

(54) INFORMATION PROCESSING APPARATUS, INFORMATION PROCESSING SYSTEM, AND NON-TRANSITORY COMPUTER-READABLE STORAGE MEDIUM

(71) Applicant: FUJITSU LIMITED, Kawasaki-shi, Kanagawa (JP)

(72) Inventor: Tatsuo Kumano, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/175,922

(22) Filed: Oct. 31, 2018

(65) Prior Publication Data
US 2019/0141129 A1 May 9, 2019

(30) Foreign Application Priority Data
Nov. 6, 2017 (JP) .................. 2017-213934

(51) Int. Cl.
*G06F 15/16* (2006.01)
*H04L 29/08* (2006.01)
*H04L 12/26* (2006.01)

(52) U.S. Cl.
CPC .......... *H04L 67/1097* (2013.01); *H04L 43/08* (2013.01); *H04L 43/16* (2013.01); *H04L 67/14* (2013.01)

(58) Field of Classification Search
CPC ..... H04L 67/1097; H04L 67/14; H04L 43/08; H04L 43/16

USPC ........................................... 709/217
See application file for complete search history.

(56) References Cited

U.S. PATENT DOCUMENTS
5,907,837 A 5/1999 Ferrel et al.

FOREIGN PATENT DOCUMENTS
JP 9-325968 12/1997
JP 2017-509046 3/2017
WO 2015/103560 7/2015

*Primary Examiner* — Wing F Chan
*Assistant Examiner* — Joseph R Maniwang
(74) *Attorney, Agent, or Firm* — Fujitsu Patent Center

(57) ABSTRACT

An information processing apparatus coupled to a storage device that stores object data including pieces of data, the information processing apparatus including a memory and a processor configured to execute a process including measuring a first acquisition time to acquire data that satisfy an acquisition condition from the storage device on an object-by-object basis, measuring a second acquisition time to acquire the data on a session-by-session basis, determining whether to acquire the data that satisfy the acquisition condition with an object-based acquisition that acquire the data on the object-by-object basis, or with a session-based acquisition that acquire the data on the session-by-session basis based on the first acquisition time and the second acquisition time, and upon a reception of a data acquisition request including the acquisition condition, acquiring the data that satisfy the acquisition condition on from the storage device in accordance with a result of the determining.

12 Claims, 31 Drawing Sheets

| TIME | SOURCE ADDRESS | SOURCE PORT | DESTINATION ADDRESS | DESTINATION PORT | COMMUNICATION TYPE | OBJECT NAME | OFFSET | SIZE (BYTE) |
|---|---|---|---|---|---|---|---|---|
| 2017-9-27 14:30:00 | 192.168.1.2 | 45861 | 192.168.1.1 | 80 | TCP | A | 0 | 10,680 |
| ... | ... | ... | ... | ... | ... | ... | ... | ... |

{SESSION INFORMATION spans SOURCE ADDRESS through COMMUNICATION TYPE}

54

| OBJECT NAME | OFFSET | SIZE (BYTE) |
|---|---|---|
| A | 564,000 | 4,194,304 |
| ... | ... | ... |

| NUMBER OF SESSIONS THAT SATISFY CONDITIONS | OBJECT-BASED ACQUISITION TIME | SESSION-BASED ACQUISITION TIME |
|---|---|---|
| 10 | 2 SEC | <u>0.7 SEC</u> |
| 20 | 2 SEC | <u>1 SEC</u> |
| 25 | 3 SEC | <u>1.5 SEC</u> |
| 30 | <u>2.5 SEC</u> | 2.8 SEC |
| 40 | <u>2 SEC</u> | 3 SEC |
| 20 | 3 SEC | <u>1 SEC</u> |
| 50 | <u>3 SEC</u> | 4 SEC |
| 60 | 3 SEC | <u>2.5 SEC</u> |
| 80 | <u>3 SEC</u> | 7 SEC |
| 120 | <u>2 SEC</u> | 5 SEC |
| ⋮ | ⋮ | ⋮ |

| NUMBER OF SESSIONS THAT SATISFY CONDITIONS | OBJECT-BASED ACQUISITION TIME | SESSION-BASED ACQUISITION TIME |
|---|---|---|
| 10 | | 0.7 SEC |
| 20 | 2 SEC | |
| 25 | | 1.5 SEC |
| 30 | 2.5 SEC | |
| 40 | | 3 SEC |
| ⋮ | ⋮ | ⋮ |
| 20 | | 1 SEC |
| 50 | | 4 SEC |
| 10 | 2 SEC | |
| 60 | 3 SEC | |
| 80 | | 7 SEC |
| 40 | 2 SEC | |
| 120 | | 5 SEC |
| ⋮ | ⋮ | ⋮ |

| RATIO OF DATA AMOUNT OF CONDITION-SATISFIED SESSIONS | OBJECT-BASED ACQUISITION TIME | SESSION-BASED ACQUISITION TIME |
|---|---|---|
| 0.1 | 2 SEC | <u>0.7 SEC</u> |
| 0.3 | 2 SEC | <u>1 SEC</u> |
| 0.2 | 3 SEC | <u>1.5 SEC</u> |
| 0.25 | <u>2.5 SEC</u> | 2.8 SEC |
| 0.3 | 2 SEC | 3 SEC |
| 0.2 | 3 SEC | <u>1 SEC</u> |
| 0.4 | <u>3 SEC</u> | 4 SEC |
| 0.55 | 3 SEC | <u>2.5 SEC</u> |
| 0.6 | <u>3 SEC</u> | 7 SEC |
| 0.8 | <u>2 SEC</u> | 5 SEC |
| ⋮ | ⋮ | ⋮ |

| NUMBER OF SESSIONS THAT SATISFY CONDITIONS | RATIO OF DATA AMOUNT OF CONDITION-SATISFIED SESSIONS | OBJECT-BASED ACQUISITION TIME | SESSION-BASED ACQUISITION TIME |
|---|---|---|---|
| 10 | 0.1 | 2 SEC | 0.7 SEC |
| 20 | 0.3 | 2 SEC | 1 SEC |
| 25 | 0.2 | 3 SEC | 1.5 SEC |
| 30 | 0.25 | 2.5 SEC | 2.8 SEC |
| 40 | 0.3 | 2 SEC | 3 SEC |
| 20 | 0.2 | 3 SEC | 1 SEC |
| 50 | 0.4 | 3 SEC | 4 SEC |
| 60 | 0.55 | 3 SEC | 2.5 SEC |
| 80 | 0.6 | 3 SEC | 7 SEC |
| 120 | 0.8 | 2 SEC | 5 SEC |
| ... | ... | ... | ... |

INFORMATION PROCESSING APPARATUS, INFORMATION PROCESSING SYSTEM, AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2017-213934, filed on Nov. 6, 2017, the entire contents of which are incorporated herein by reference.

FIELD

The embodiments discussed herein are related to an information processing apparatus, an information processing system, and a non-transitory computer-readable storage medium.

BACKGROUND

Publishers, who publish various types of information to on-line services, define inquiries for search based on story characteristics, including topics, places, and figures, separately from the published contents, and issues the same to a data center. The information retrieval server of the data center parses a search object to find a predetermined content and indexes the same. This provides high retrieval performance for customers in an online service including plural publishers (see Japanese Laid-open Patent Publication No. 9-325968, for example).

Cloud analysis and presentation services select a data center to be used by a user, from data center candidates determined based on data center specifications inputted by the user of a cloud service and data center requirements including costs and performances. When the data centers are updated, it is determined whether transition to another data center benefits the user (see Japanese National Publication of International Patent Application No. 2017-509046, for example).

SUMMARY

According to an aspect of the embodiments, an information processing apparatus coupled to a storage device that stores object data including pieces of data each of which corresponds to any one of a plurality of sessions, the information processing apparatus including a memory and a processor coupled to the memory and the processor configured to execute a process, the process including measuring a first acquisition time to acquire data that satisfy an acquisition condition from the storage device on an object-by-object basis, measuring a second acquisition time to acquire the data that satisfy the acquisition condition from the storage device on a session-by-session basis, determining whether to acquire, from the storage device, the data that satisfy the acquisition condition with an object-based acquisition that acquire the data on the object-by-object basis, or with a session-based acquisition that acquire the data on the session-by-session basis based on the first acquisition time and the second acquisition time, and upon a reception of a data acquisition request including the acquisition condition, acquiring the data that satisfy the acquisition condition on from the storage device in accordance with a result of the determining.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating examples of a session information table and an object information table illustrated in FIG. 3;

FIG. 5 is a diagram illustrating an example of information stored in a diagnosis information table illustrated in FIG. 3;

FIG. 14 is a diagram illustrating an example of information stored in a diagnosis information table illustrated in FIG. 13;

FIG. 20 is a diagram illustrating an example of information stored in a diagnosis information table illustrated in FIG. 19;

FIG. 22 is a diagram illustrating an example of information stored in a diagnosis information table illustrated in FIG. 21;

DESCRIPTION OF EMBODIMENTS

There are capture apparatuses which acquire data transmitted between communication apparatuses by mirroring or another method. This type of capture apparatus sequentially stores the acquired data in a storage apparatus. When receiving an acquisition request including acquisition conditions, the capture apparatus acquires data satisfying the acquisition conditions from the storage apparatus and transfers the acquired data to the source of the acquisition request.

In an aspect, an object is to set an index to select an acquisition method that efficiently acquires data, from several acquisition methods to acquire data that satisfy acquisition conditions from the storage apparatus.

Hereinafter, a description is given of embodiments using the drawings.

Figure 1:
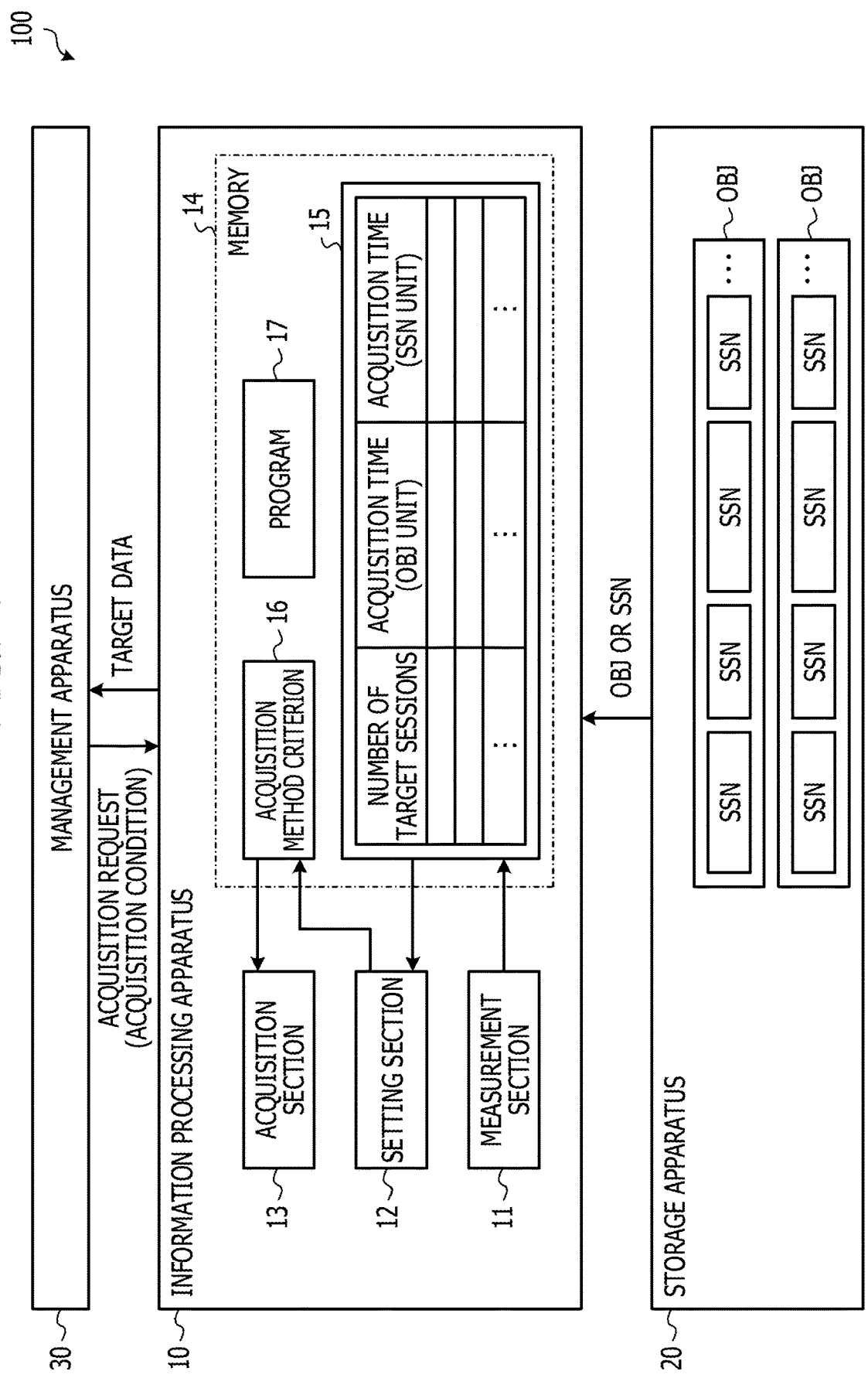
FIG. 1 is a diagram illustrating an embodiment of an information processing apparatus, an information processing system, and a program.

FIG. 1 illustrates an embodiment of an information processing apparatus, an information processing system, and a program. An information processing system 100 illustrated in FIG. 1 includes an information processing apparatus 10, a storage apparatus 20 connected to the information processing apparatus 10, and a management apparatus 30 that manages the information processing apparatus 10.

The management apparatus 30 issues an acquisition request including acquisition conditions to the information processing apparatus 10 and acquires target data that satisfy the acquisition conditions from the storage apparatus 20 through the information processing apparatus 10. When receiving the acquisition request from the management apparatus 30, the information processing apparatus 10 acquires target data that satisfy the acquisition conditions from the storage apparatus 20. In this process, as described later, the information processing apparatus 10 acquires the target data by using an acquisition method with which the information processing apparatus 10 is estimated to acquire the target data from the storage apparatus 20 in the shortest time. The information processing apparatus 10 then transmits the acquired data to the management apparatus 30. The information processing apparatus 10 is an example of a first information processing apparatus, and the management apparatus 30 is an example of a second information processing apparatus.

The information processing apparatus 10 includes a measurement section 11, a setting section 12, an acquisition section 13, and a memory 14. The functions of the measurement section 11, setting section 12, and acquisition section 13 are implemented by the information processing apparatus 10 executing a program stored in the memory 14, for example. The functions of the measurement section 11, setting section 12, and acquisition section 13 may be implemented by hardware such as a field-programmable gate array (FPGA) provided for the information processing apparatus 10.

The memory 14 includes a storage area 15 that stores: the first number of sessions; an acquisition time (sometimes referred to as an object-based acquisition time) taken to acquire target data from the storage apparatus 20 on an object-by-object basis; and an acquisition time (sometimes referred to as a session-based acquisition time) taken to acquire the target data from the storage apparatus 20 on a session-by-session basis. The storage area for the first number of sessions stores the number of sessions SSN containing the target data that satisfy the acquisition conditions. The memory 14 further includes: a storage area storing an acquisition method criterion 16; and a storage area storing a program 17.

The storage apparatus 20 stores objects OBJ including data containing a predetermined number of sessions SSN. Data contained in sessions SSN are also referred to as sessions SSN hereinafter. For example, sessions SSN correspond to communication sessions between not-illustrated other information processing apparatuses. Each session SSN includes identical transmission sources and destinations of data (packets). For example, the not-illustrated capture apparatus captures data transmitted between other information processing apparatuses, such as communication apparatuses, and stores the captured data in the storage apparatus 20 as objects OBJ each including data that from a predetermined number of sessions SSN. The capture apparatus may be provided within the information processing apparatus 10.

The measurement section 11 measures the acquisition time taken to acquire target data from the storage apparatus 20 on an object-by-object basis and the acquisition time taken to acquire target data from the storage apparatus 20 on a session-by-session basis for each of the acquisition conditions included in an acquisition request. For example, the measurement section 11 searches the objects OBJ stored in the storage apparatus 20 for objects OBJ including data that satisfy the acquisition condition. The measurement section 11 then measures the acquisition time taken to acquire the target data on an object-by-object basis and the acquisition time taken to acquire the target data on a session-by-session basis for each of the objects OBJ obtained by the search.

The measurement section 11 stores the measured object-based acquisition time and session-based acquisition time in the storage area 15 together with the number of sessions SSN containing the target data in each object OBJ. The measurement section 11 may store in the storage area 15, the ratio of target data in each object OBJ including the target data (the ratio of the amount of target data to the amount of data of the object OBJ) instead of the number of sessions.

The setting section 12 sets the acquisition method criterion for determining whether to acquire data from the storage apparatus on an object-by-object basis (sometimes referred to as an object-based acquisition method) or on a session-by-session basis (sometimes referred to as a session-based acquisition method), based on the information stored in the storage area 15. For example, the setting section 12 determines which of the object-based and the session-based acquisition times is the shorter, for some different numbers of sessions. The setting section 12 calculates the number of sessions at which the magnitude relationship between the object-based acquisition time and session-based acquisition time is reversed as the number of sessions increases. The setting section 12 sets the calculated number of sessions as the acquisition method criterion (threshold). In the process of acquiring data stored in the storage apparatus 20, therefore, the acquisition method criterion is calculated as an index indicating which of the object-based acquisition method and the session-based acquisition method allows for more efficient data acquisition. The number of sessions at which the magnitude relationship between the object-based and session-based acquisition times is reversed may be calculated statistically.

The acquisition section 13 operates upon receiving an acquisition request including acquisition conditions from the management apparatus 30, for example. The acquisition section 13 acquires data from the storage apparatus 20 on an object-by-object basis or on a session-by-session basis based on the acquisition method criterion 16 (threshold) for each object OBJ including target data that satisfy the acquisition conditions. The acquisition section 13 then transmits the acquired data to the management apparatus 30.

When the acquisition conditions specify "the information processing apparatus that has transmitted data", for example, the acquisition section 13 selects objects OBJ including data (packets) transmitted from the information processing apparatus satisfying the acquisition conditions. Based on the acquisition method criterion 16 set by the setting section 12, the acquisition section 13 determines whether to acquire target data on an object-by-object basis or on a session-by-session basis for each of the objects OBJ. The acquisition section 13 then acquires the data from the storage apparatus 20 using the determined acquisition method. By selecting the method of acquiring target data based on the acquisition method criterion for each object OBJ, target data is acquired more efficiently than in the case where the acquisition method is not selectable and is fixed.

Figure 2:
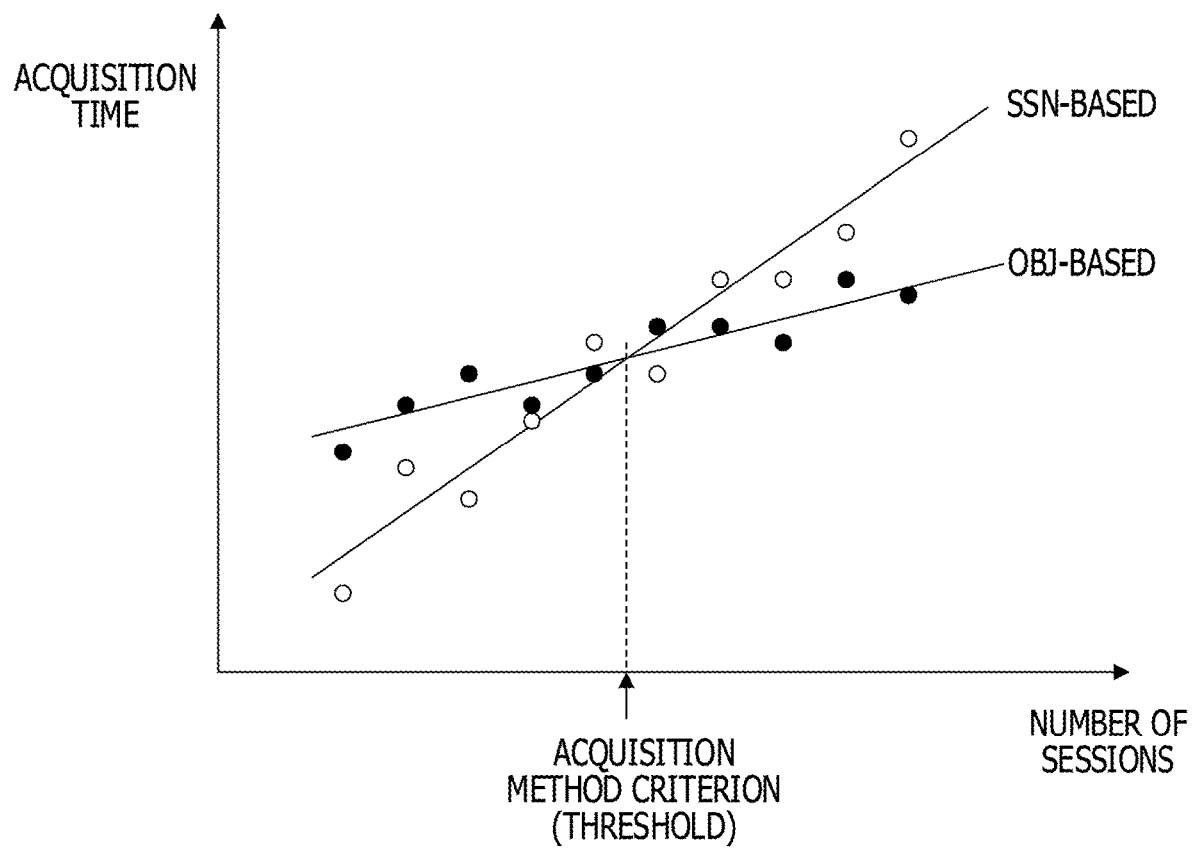
FIG. 2 is a diagram illustrating examples of acquisition time measured by a measuring section illustrated in FIG. 1 and an acquisition method criterion set by a setting section illustrated in FIG. 1.

FIG. 2 illustrates examples of the acquisition time measured by the measurement section 11 illustrated in FIG. 1 and the acquisition method criterion set by the setting section 12 illustrated in FIG. 1. In FIG. 2, black dots represent acquisition time measured when the measurement section 11 acquires target data on an object-by-object basis, with respect to the number of sessions. White dots represent acquisition time measured when the measurement section 11 acquires target data on a session-by-session basis, with respect to the number of sessions. Based on the distribution of the object-based acquisition time and session-based acquisition time, the setting section 12 sets the acquisition method criterion (threshold) to the number of sessions at which the relationship between the object-based and session-based acquisition times is reversed.

For example, when the number of sessions SSN containing data that satisfy acquisition conditions in each object OBJ including the data that satisfy the acquisition conditions is greater than the number of sessions specified as the acquisition method criterion (threshold), the acquisition section 13 illustrated in FIG. 1 acquires the data on an object-by-object basis. When the number of sessions SSN containing data that satisfy acquisition conditions in each object OBJ including the data that satisfy the acquisition conditions is not greater than the number of sessions specified in the acquisition method criterion (threshold), the acquisition section 13 acquires the data on a session-by-session basis. In other words, the acquisition section 13 changes the acquisition method for each object OBJ based on the acquisition method criterion. The efficiency of acquisition of data from the storage apparatus 20 with this method is higher than that with only object-based acquisition method or only session-based acquisition method.

As described above, the embodiment illustrated in FIGS. 1 and 2 provides the following effects. The setting section 12 sets the acquisition method criterion which is an index indicating which of the object-based acquisition method and session-based acquisition method allows for more efficient acquisition of data that satisfy acquisition conditions. In this process, the setting section 12 sets the acquisition method criterion based on the acquisition time actually measured by the measurement section 11, so that the acquisition method criterion is set at a higher degree of accuracy than the case where the acquisition method criterion is set based on the acquisition time obtained by calculation or prediction. The acquisition section 13 changes the data acquisition method for each object OBJ based on the acquisition method criterion set by the setting section 12, so that data is acquired from the storage apparatus 20 more efficiently than in the case where the data acquisition method is not selectable. This improves the processing performance of the information processing system 100.

Figure 3:
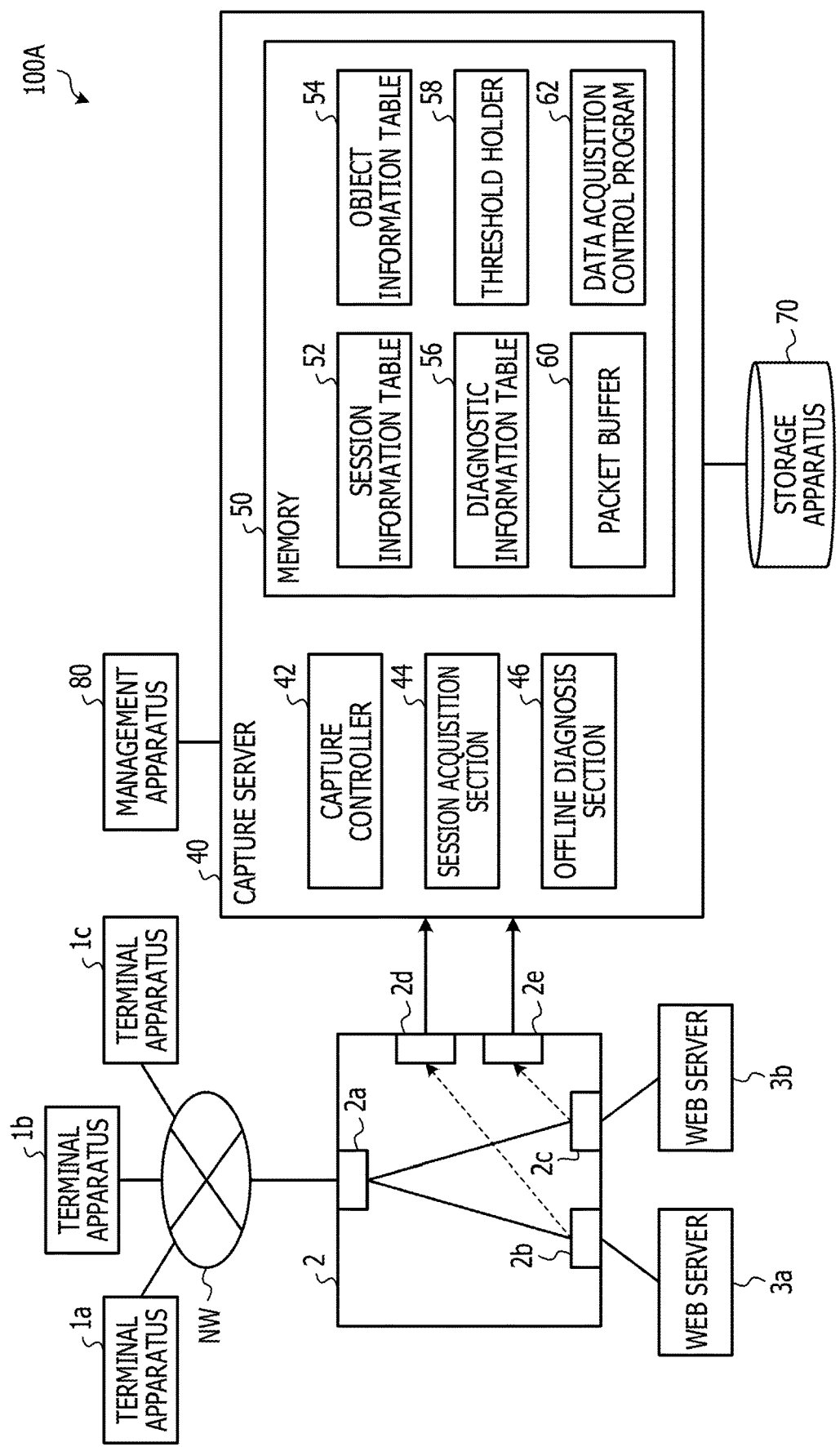
FIG. 3 is a diagram illustrating another embodiment of the information processing apparatus, information processing system, and program.

FIG. 3 illustrates another embodiment of the information processing apparatus, information processing system, and program. An information processing system 100A illustrated in FIG. 3 includes: a capture server 40 connected to a network switch 2; a storage apparatus 70 connected to the capture server 40; and a management apparatus 80 connected to the capture server 40. The management apparatus 80 is used by an administrator managing a network NW, for example. The management apparatus 80 may be connected to the capture server 40 through a network switch.

The capture server 40 is an example of the information processing apparatus and the first information processing apparatus. The management apparatus 80 is an example of the second information apparatus. The storage apparatus 70 is an example of the storage apparatus.

The network switch 2 changes routes of packets exchanged between terminal apparatuses 1 (1*a*, 1*b*, 1*c*) connected to the network NW and web servers 3 (3*a*, 3*b*). Each terminal apparatus 1 is a computer used by a user who uses the web servers 3, for example. The terminal apparatuses 1 and web servers 3 are examples of the other information processing apparatuses.

The network NW is connected to a port 2*a* of the network switch 2, and each of the web servers 3*a* and 3*b* is connected to any one of ports 2*b* and 2*c* of the network switch 2. The capture server 40 receives a packet transmitted to the port 2*b* through a mirror port 2*d* while receiving a packet transmitted to the port 2*c* through a mirror port 2*e*.

The information processing system 100A may include the network switch 2 and web servers 3. The capture server 40 may be connected to a tap provided between the network NW and web servers 3*a* and 3*b*, instead of the mirror ports 2*d* and 2*e*. In this case, the capture server 40 captures packets exchanged between the terminal apparatuses 1 and web servers 3 via the tap. The capture server 40 may capture information such as data exchanged between apparatuses other than the terminal apparatuses 1 and web servers 3. For example, a calculation server may be provided instead of the web servers 3. Alternatively, a web server may be provided instead of the terminal apparatuses 1 while a storage server, a database system, or the like is provided instead of the web servers 3.

Figure 6:
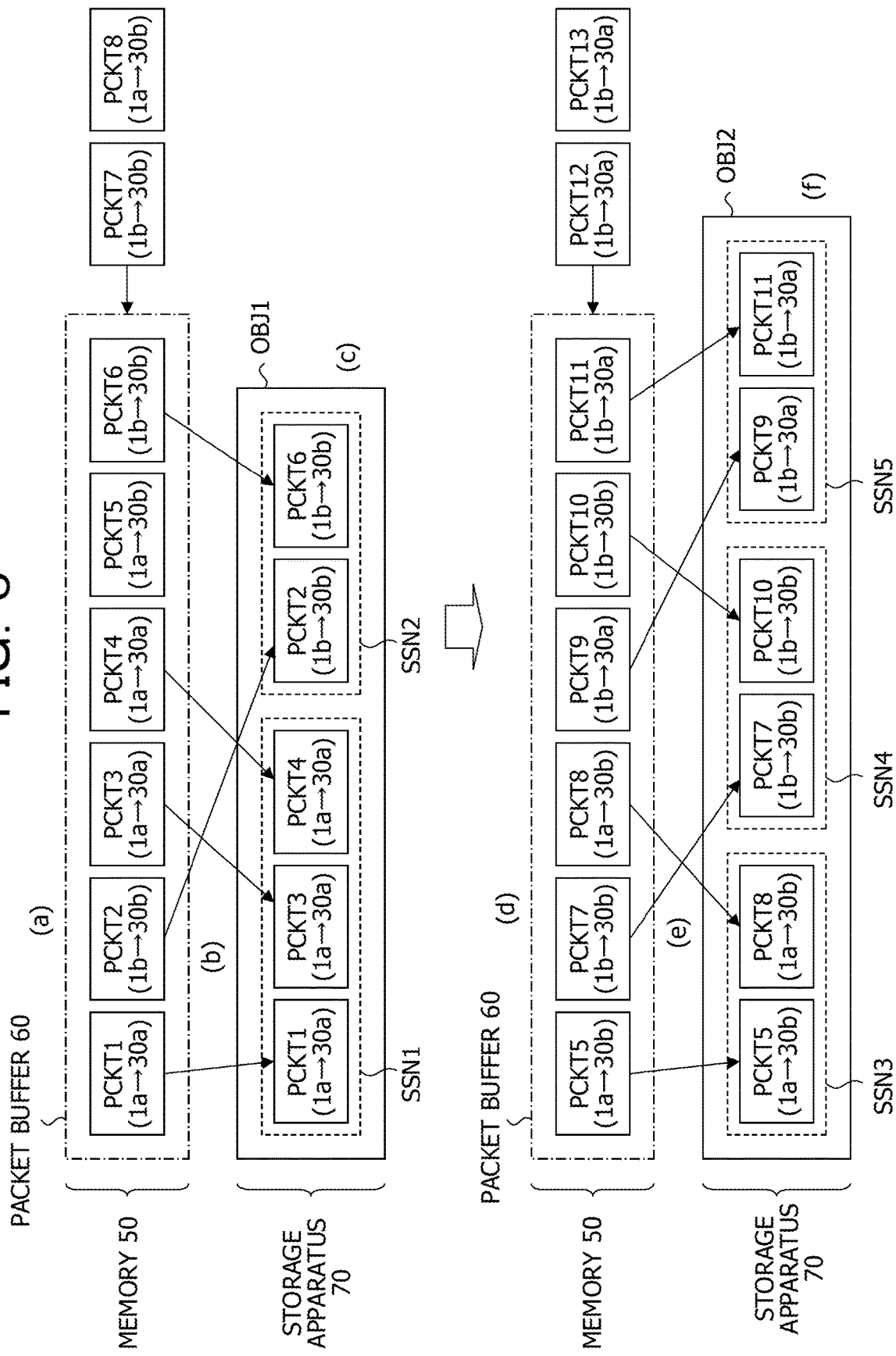
FIG. 6 is a diagram illustrating an operation example of a capture controller illustrated in FIG. 3.

The capture server 40 includes a capture controller 42, a session acquisition section 44, offline diagnosis section 46, and a memory 50. The capture controller 42 operates during a capture mode to capture packets. The capture controller 42 captures through the mirror ports 2d, 2e, packets exchanged between the terminal apparatuses 1 and web servers 3 and stores the captured packets in the storage apparatus 70. The packets stored in the storage apparatus 70 are examples of data. FIG. 6 illustrates an operation example of the capture controller 42.

Figure 7:
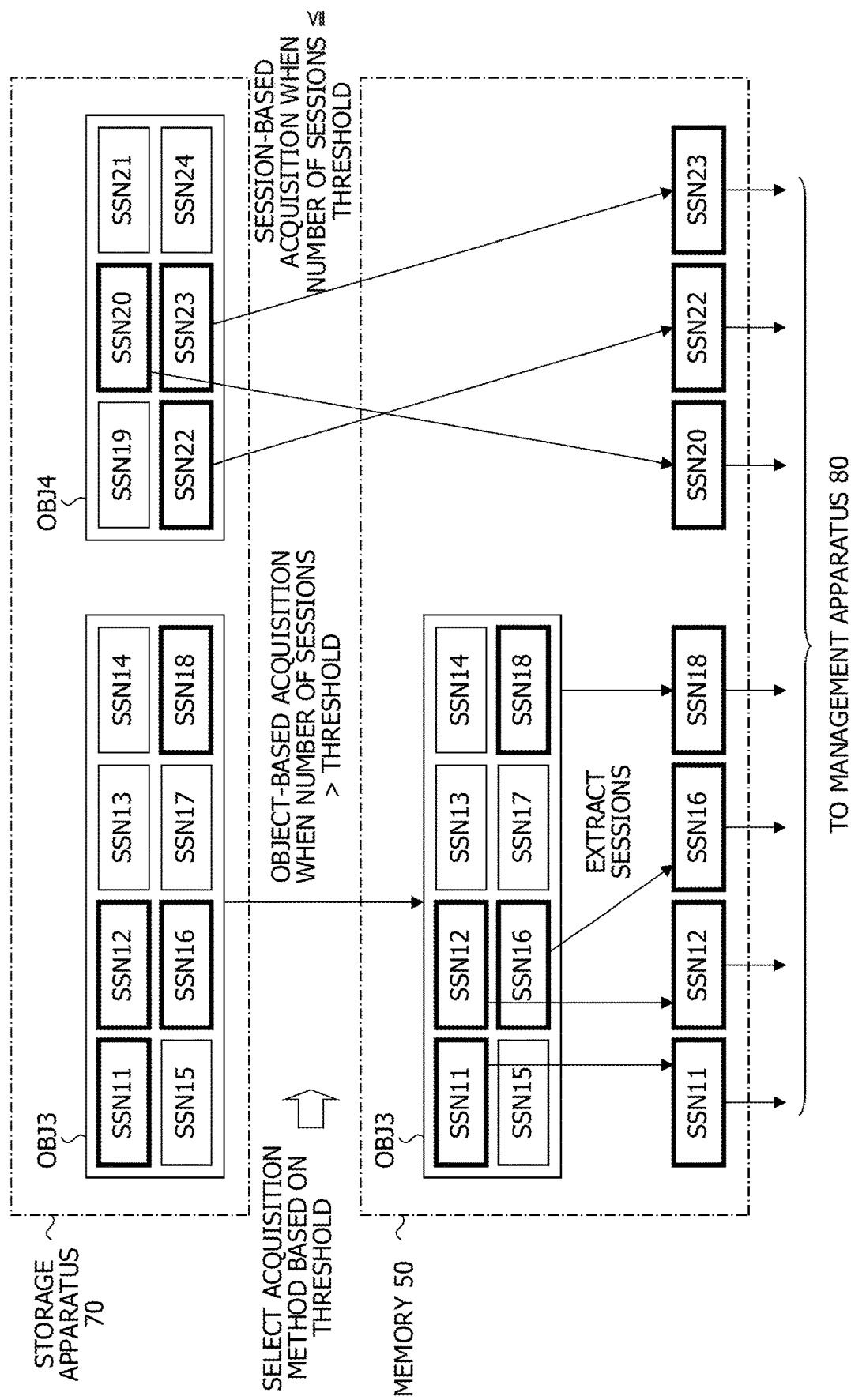
FIG. 7 is a diagram illustrating an operation example of a session acquisition section illustrated in FIG. 3.
Figure 12:
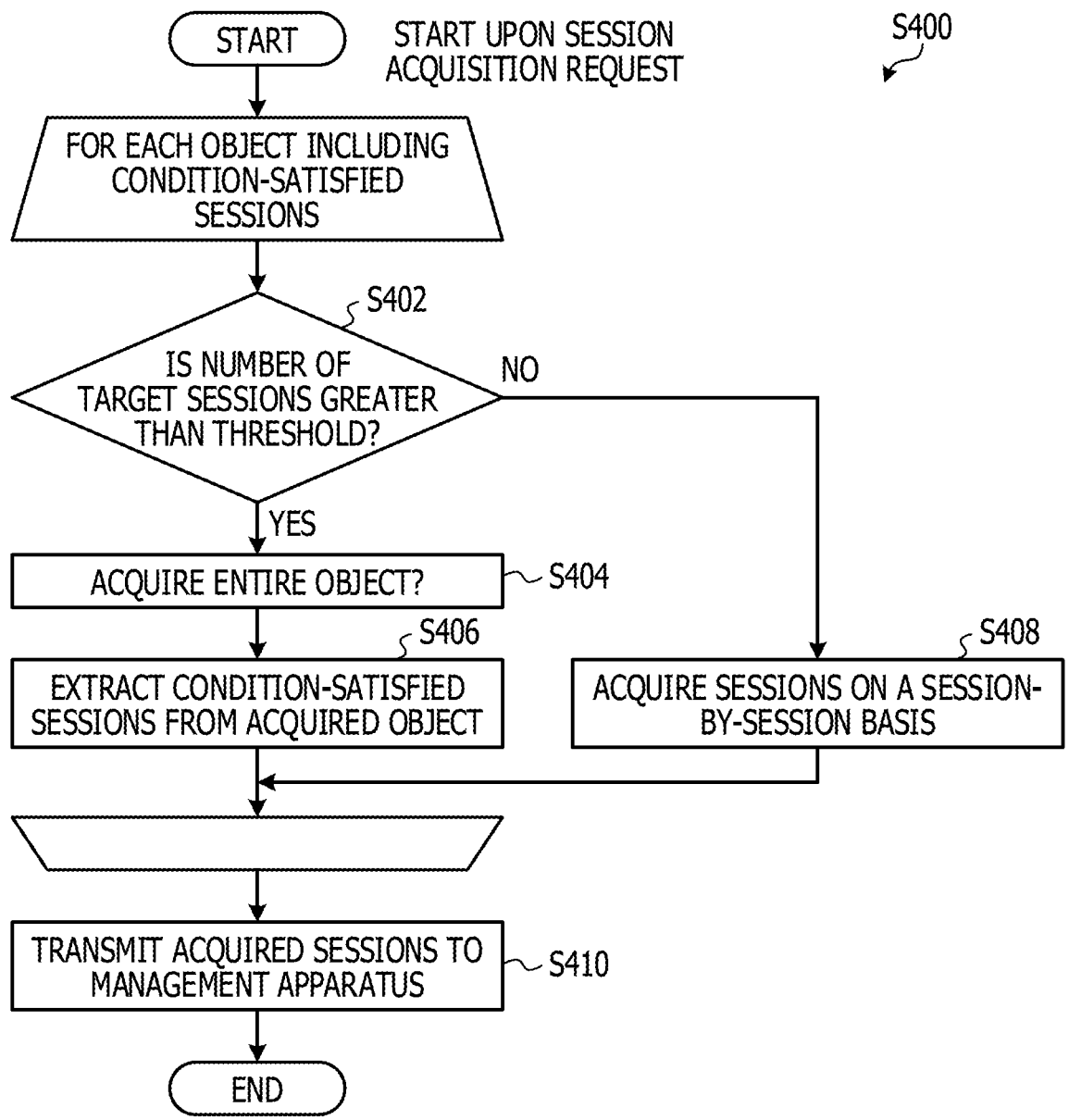
FIG. 12 is a diagram illustrating an operation example of the session acquisition section illustrated in FIG. 3.

When receiving an acquisition request of the management apparatus 80 to acquire sessions including packets having the same transmission source and destination, for example, the session acquisition section 44 acquires from the storage apparatus 70, packets included in the sessions that satisfy the acquisition conditions included in the received acquisition request. The acquisition conditions include at least one of information indicating the transmission source and information indicating the destination, for example. Herein, the session acquisition section 44 acquires the packets with the acquisition method that is expected to minimize the time taken to acquire target packets included in the sessions, from the storage apparatus 70, using a later-described threshold. The session acquisition section 44 transmits the acquired packets to the management apparatus 80. An operation example of the session acquisition section 44 is illustrated in FIGS. 7 and 12. The session acquisition section 44 is an example of the acquisition section that acquires packets (data) included in sessions from the storage apparatus 70 on an object-by-object basis or on a session-by-session basis. In the following description, packets included in sessions are also referred to as just sessions, and acquisition of packets by the session acquisition section 44 is also referred to as acquisition of sessions.

The offline diagnosis section 46 operates during a non-capture mode in which the capture server 40 does not capture packets from the mirror ports 2d, 2e and calculates the threshold using packets (sessions) previously stored in the storage apparatus 70. The threshold is an example of the acquisition method criterion. An operation example of the offline diagnosis section 46 is illustrated in FIGS. 8 to 11. The offline diagnosis section 46 may operate during a non-acquisition mode in which the management apparatus 80 does not issue any acquisition request.

The memory 50 includes a memory module including plural synchronous dynamic random access memories (SDRAMs), for example. The memory 50 may include a static random access memory (SRAM) or a non-volatile memory such as a flash memory or a magnetoresistive random access memory (MRAM).

The memory 50 includes a storage area which is assigned to a session information table 52, an object information table 54, a diagnosis information table 56, a threshold holder 58, and a packet buffer 60 and a storage area storing a data acquisition control program 62. Examples of the session information table 52 and object information table 54 are illustrated in FIG. 4. An example of the diagnosis information table 56 is illustrated in FIG. 5. The threshold holder 58 holds a later-described threshold. The threshold may be held in a register included in a not-illustrated processor provided in the capture server 40, instead of the threshold holder 58. The packet buffer 60 holds packets which are received through the mirror ports 2d and 2e and are to be stored in the storage apparatus 70.

The functions of the capture controller 42, session acquisition section 44, and offline diagnosis section 46 are implemented by the capture server 40 executing the data acquisition control program 62. The capture controller 42, session acquisition section 44, and offline diagnosis section 46 may be implemented by hardware such as a FPGA included in the capture server 40.

The storage apparatus 70 includes a hard disk drive (HDD), a solid state drive (SSD), or the like and stores packets captured by the capture server 40. The management apparatus 80 transmits an acquisition request to acquire sessions that satisfy acquisition conditions together with the acquisition conditions, to the capture server 40 and analyzes packets included in the sessions received from the capture server 40. The results of analyzing the packets reveal causes of communication failures or the like occurring in communication paths between the network NW and web servers 3.

FIG. 4 illustrates examples of the session information table 52 and object information table 54 illustrated in FIG. 3. The session information table 52 holds information concerning sessions each including a predetermined number of packets having the same transmission source and destination. In FIG. 4, each row of the session information table 52 corresponds to a session. The session information table 52 includes plural areas (hereinafter, also referred to as a row area) storing time, source address, source port, destination address, destination port, communication type, object name, offset, and size. Each row area of the session information table 52 corresponds to a session.

The time area stores time when the capture server 40 receives any one of the packets (the first packet, for example) included in the session, for example. When each packet includes information indicating transmission time of the packet, the time area may store the transmission time. The source address area stores the Internet protocol (IP) address of the source apparatus of the packets included in the session. The source port area stores the port number identifying a source application of the packets included in the session.

The destination address area stores the IP address of the destination apparatus of the packets included in the interested session. The destination port area stores the port number identifying a destination application of the packets included in the session. The communication type area stores information indicating the communication protocol of the packets included in the session. The source address, source port, destination address, destination port, and communication type are session information identifying the session.

The object name area stores information identifying an object including the interested session among plural objects held in the storage apparatus 70. The offset area stores information such as an address indicating the position of the session in the object indicated by the object name. The size area stores the size of the session.

The object information table 54 holds information concerning an object (including a predetermined number of sessions) as a unit by which the capture server 40 stores a group of packets in the storage apparatus 70. The object information table 54 includes plural areas (hereinafter, also referred to as a row area) storing object name, offset, and size. Each row area of the object information table 54 corresponds to one object.

The object name is the same as the object name stored in the session information table 52. When an object includes three sessions, for example, the same object name is stored in three row areas corresponding to the three sessions in the session information table 52. The offset area stores information such as an address indicating the position of the object in the storage area which is allocated in the storage apparatus 70 to store the object. The size area stores the size of the object.

When generating an object including captured packets (sessions), the capture controller 42 stores information concerning the generated object in a row area of the object information table 54. The capture controller 42 stores information concerning the sessions included in the object in a row area of the session information table 52. Herein, the source address, source port, destination address, destination port, and communication type are information included in packets. An example of generation of an object by the capture controller 42 is illustrated in FIG. 6.

Figure 9:
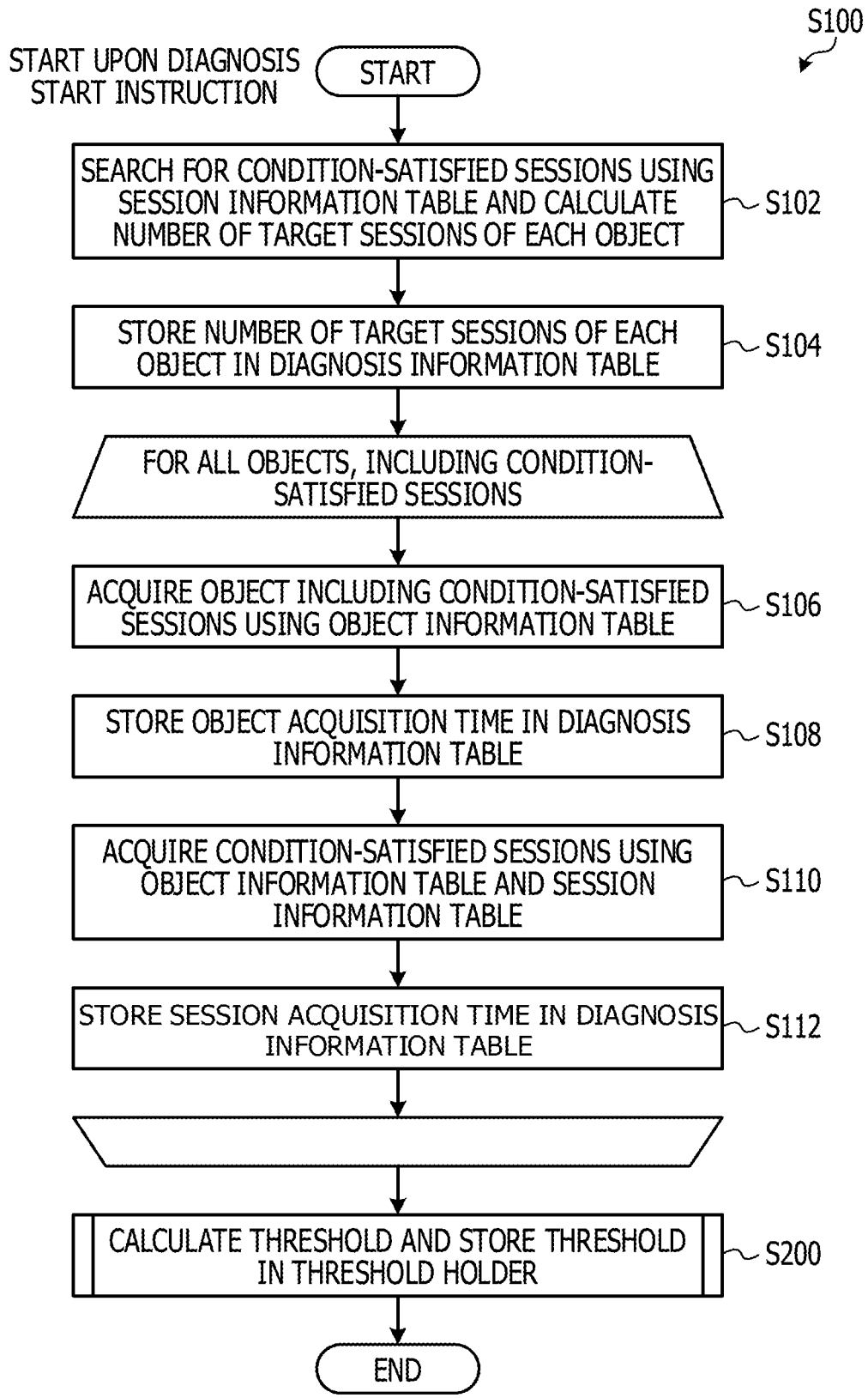
FIG. 9 is a diagram illustrating an operation example of an offline diagnosis section illustrated in FIG. 3.

FIG. 5 illustrates an example of information stored in the diagnosis information table 56 illustrated in FIG. 3. The diagnosis information table 56 includes plural areas (hereinafter, also referred to as a row area) storing "the number of sessions that satisfy acquisition conditions", "the object-based acquisition time", and "the session-based acquisition time". The information held in the diagnosis information table 56 is stored by the offline diagnosis section 46. FIG. 9 illustrates an example in which the offline diagnosis section 46 stores information in the diagnosis information table 56.

The area of "the number of sessions that satisfy acquisition conditions" stores the number of sessions included in each of a certain number of objects that include sessions satisfying acquisition conditions included in an acquisition request from the management apparatus 80. The area of "the object-based acquisition time" stores the time taken to read the same number of sessions as indicated by "the number of sessions that satisfy acquisition conditions" from the storage apparatus 70 on an object-by-object basis. The area of "the session-based acquisition time" stores the time taken to read the same number of sessions as indicated by "the number of sessions that satisfy acquisition conditions" from the storage apparatus 70 on a session-by-session basis.

In the example illustrated in FIG. 5, when 10 sessions are acquired from a certain object, the object-based acquisition time is 2 seconds while the session-based acquisition time is 0.7 seconds. When 50 sessions are acquired from a certain object, the object-based acquisition time is 3 seconds while the session-based acquisition time is 4 seconds. In FIG. 5, the shorter one of the acquisition times in each row area is underlined for explanation. The acquisition time stored in the diagnosis information table 56 is an example of the acquisition time by the number of sessions and depends on the size of sessions to be acquired. In FIG. 5, the diagnosis information table 56 contains two acquisition times for 20 sessions.

FIG. 6 illustrates an operation example of the capture controller 42 illustrated in FIG. 3. For easy understanding of explanation, it is assumed that the packet buffer 60 is able to hold six packets PCKT in FIG. 6. The number at the end of "PCKT" of each packet indicates the order in which the packet PCKT is captured. The symbol to the left of an arrow in brackets of each packet PCKT indicates the source apparatus of the packet PCKT while the symbol to the right of an arrow in brackets of the packet PCKT indicates the destination apparatus of the packet PCKT. For easy understanding of explanation, in FIG. 6, it is assumed that packets PCKT transmitted from the terminal apparatuses 1 to the web servers 3 are captured.

First, the capture controller 42 sequentially stores the captured packets PCKT (PCKT1 to PCKET6) in the packet buffer 60 (FIG. 6(a)). When the packet buffer 60 holds six packets PCKT, the capture controller 42 classify the six packets PCKT into sessions SSN (SSN1, SSN2) so that each session SSN includes packets of the same pair of source and destination (FIG. 6(b)). The capture controller 42 stores an object OBJ1 including the sessions SSN1 and SSN2 in the storage apparatus 70 (FIG. 6(c)).

The capture controller 42 stores information concerning the object OBJ1 in the object information table 54 illustrated in FIG. 4. The capture controller 42 stores information concerning the sessions SSN1 and SSN2 included in the object OBJ1, in the session information table 52 illustrated in FIG. 4.

The capture controller 42 deletes the packets PCKT having been stored in the storage apparatus 70, from the packet buffer 60. For example, the capture controller 42 does not classify in a session SSN, the packet PCKT5 which has a different pair of source and destination from those of the other packets PCKT held in the packet buffer 60. The packet PCKT5 is therefore left in the packet buffer 60.

Subsequently, the capture controller 42 sequentially stores newly captured packets PCKT (PCKT7 to PCKT11) in the packet buffer 60 (FIG. 6(d)). Since the packet buffer 60 holds the six packets PCKT, the capture controller 42 classify the packets PCKT into sessions SSN (SSN3, SSN4, SSN5) so that packets PCKT included in each session have identical sources and destinations (FIG. 6(e)). The capture controller 42 then stores an object OBJ2 including the sessions SSN3, SSN4, and SSN5 in the storage apparatus 70 (FIG. 6(f)).

The capture controller 42 stores information concerning the object OBJ2 in the object information table 54 and stores information concerning the sessions SSN3, SSN4, and SSN5 included in the object OBJ2, in the session information table 52. The capture controller 42 deletes the packets PCKT having been stored in the storage apparatus 70, from the packet buffer 60.

The capture controller 42 thus stores the packets PCKT captured through the mirror ports 2d, 2e in the storage apparatus 70 in terms of objects each including a certain number of sessions SSN. The capture controller 42 may classify the packets PCKT held in the packet buffer 60 into sessions SSN every predetermined period of time (every 10 seconds, for example) to generate an object OBJ and store the generated object OBJ in the storage apparatus 70.

FIG. 7 illustrates an operation example of the session acquisition section 44 illustrated in FIG. 3. In FIG. 7, the storage apparatus 70 stores plural objects OBJ3 and OBJ4. For example, the session acquisition section 44 searches the storage apparatus 70 with reference to the session information table 52 based on the acquisition conditions included in the acquisition request received from the management apparatus 80 and finds an object OBJ including target sessions SSN. In FIG. 7, the sessions SSN that satisfy the acquisition conditions are indicated with thick, black boxes.

The session acquisition section 44 determines whether to acquire the target sessions SSN from the storage apparatus 70 on an object-by-object basis or on a session-by-session basis for each object OBJ found by the search, based on the threshold held in the threshold holder 58. For example, in each object OBJ, when the number of sessions SSN that satisfy the acquisition conditions is greater than the number of sessions indicated by the threshold, the session acquisition section 44 acquires the sessions SSN on an object-by-object basis and stores the acquired sessions SSN in the memory 50. When the number of sessions SSN that satisfy the acquisition conditions is not greater than the number of sessions indicated by the threshold, the session acquisition section 44 acquires the sessions SSN on a session-by-session basis and stores the acquired sessions SSN in the memory 50.

In the process of reading data from the storage apparatus 70, access penalty is produced in the storage apparatus 70 at each access to the storage apparatus 70. Herein, the access penalty is the time taken to prepare to read data. In the case of reading data from an HDD provided in the storage apparatus 70, for example, access penalty, including seek time and rotational latency, is produced. When the object OBJ includes plural sessions SSN to be read, the access penalty produced at reading the plural sessions SSN on an object-by-object basis is shorter than the access penalty produced at reading the plural sessions SSN on a session-by-session basis.

On the other hand, the time (data transfer time) taken to transfer data from the storage apparatus 70 increases in proportion to the amount of read data. In the case of reading plural sessions SSN from an object OBJ stored in the storage apparatus 70, access time, which is the sum of the data transfer time and access penalty, therefore depends on the method of acquiring the sessions SSN. The session acquisition section 44 uses a threshold (the number of sessions) to select the acquisition method estimated to minimize the access time. The method of the offline diagnosis section 46 calculating the threshold is illustrated in FIGS. 8 to 11.

In the example illustrated in FIG. 7, the threshold is 3. In the case of acquiring four sessions SSN included in the object OBJ3, from the storage apparatus 70, the session acquisition section 44 reads the object OBJ3 and extracts the sessions SSN from the read object OBJ3. The target sessions SSN are read from the storage apparatus 70 on an object-by-object basis. In the case of acquiring three sessions SSN included in the object OBJ4, from the storage apparatus 70, the session acquisition section 44 reads the target sessions SSN on a session-by-session basis from the storage apparatus 70. The session acquisition section 44 transmits the sessions SSN that satisfy the acquisition conditions to the management apparatus 80.

The time (memory access time) taken to extract sessions SSN from the object OBJ transferred to the memory 50 is short enough to be neglected compared with the time (disk access time, for example) taken to acquire the sessions SSN from the storage apparatus 70. In the case of acquiring sessions SSN on an object-by-object basis, there is no temporal penalty involved in extraction of sessions SSN within the memory 50.

Figure 8:
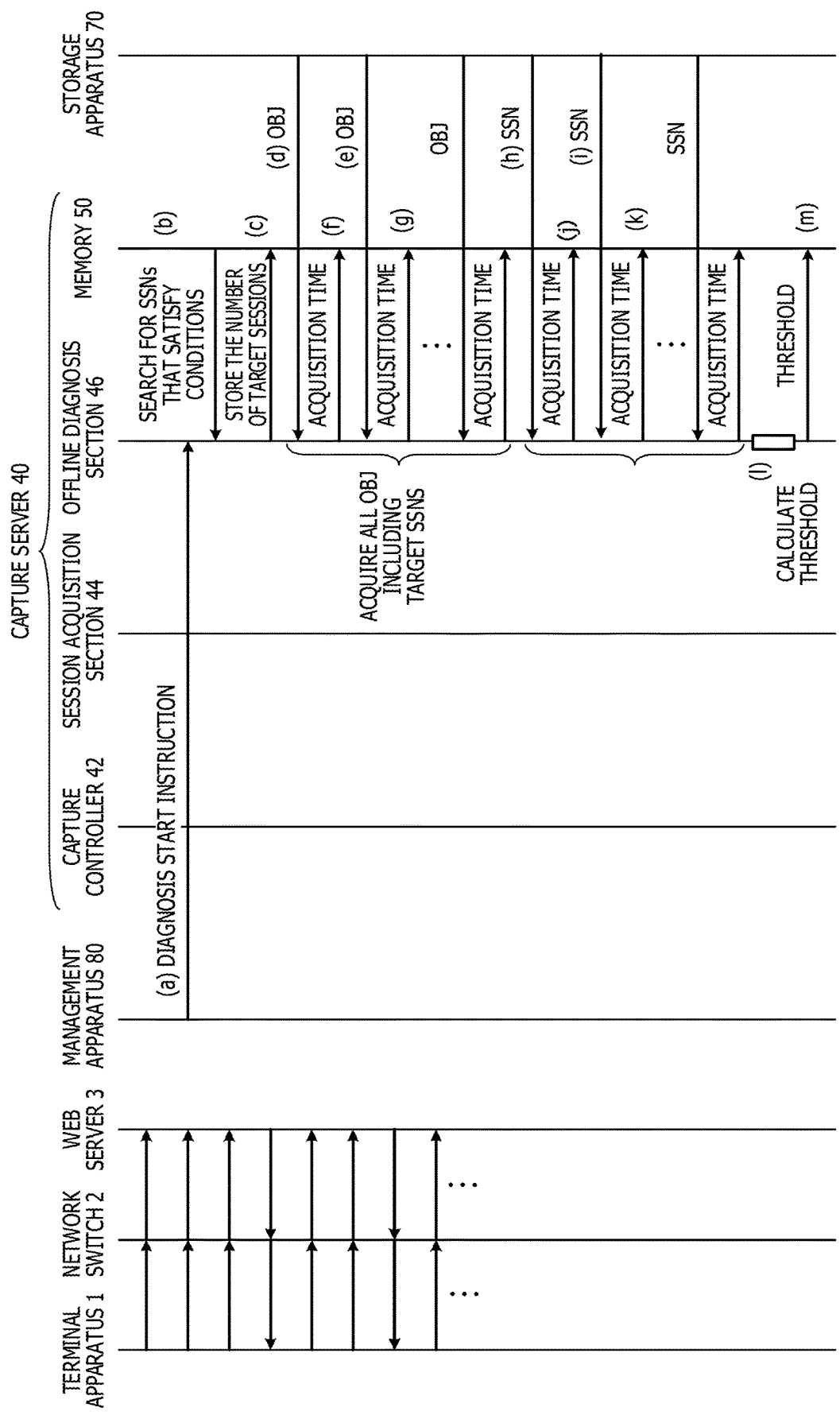
FIG. 8 is a diagram illustrating an operation example of a capture server illustrated in FIG. 3, in a non-capture mode.

FIG. 8 illustrates an operation example of the capture server 40 illustrated in FIG. 3 in a non-capture mode. As described above, the capture server 40 does not capture packets from the mirror ports 2d, 2e of the network switch 2 during the non-capture mode. FIG. 8 also illustrates an operation example of a non-acquisition mode in which the management apparatus 80 does not issue any acquisition request.

The offline diagnosis section 46 starts operating upon receiving a diagnosis start instruction to start a diagnosis of the threshold, from the management apparatus 80. Based on the diagnosis start instruction, the offline diagnosis section 46 accesses the storage apparatus 70 with reference to the session information table 52 (FIG. 4) in the memory 50 and searches for sessions SSN that satisfy the acquisition conditions included in the diagnosis start instruction (FIGS. 8 (a), (b)). The offline diagnosis section 46 calculates the number of sessions SSN that satisfy the acquisition conditions, that is, the number of target sessions, for each object OBJ and stores the calculated number of sessions in "the number of sessions that satisfy acquisition conditions" field of the diagnosis information table 56 illustrated in FIG. 5 (FIG. 8(c)).

Objects OBJ are stored in the storage apparatus 70 in advance, and the session information table 52 and object information table 54 illustrated in FIG. 4 hold information corresponding to the objects OBJ stored in the storage apparatus 70. For example, the offline diagnosis section 46 searches for sessions SSN including packets PCKT which were captured in the day before the diagnosis start instruction is received and stored in the storage apparatus 70.

The management apparatus 80 issues a diagnosis start instruction to the capture server 40 when the threshold is not held in the threshold holder 58 at the first startup of the capture server 40 or when the threshold held in the threshold holder 58 is intended to be updated. For example, the management apparatus 80 issues a diagnosis start instruction including a condition of "sessions SSN with the destination port being 80" to the offline diagnosis section 46.

The offline diagnosis section 46 calculates storage positions in the storage apparatus 70, of all the objects OBJ including the sessions SSN that satisfy the acquisition conditions, with reference to the object information table 54. The offline diagnosis section 46 sequentially acquires all the objects OBJ including the sessions SSN that satisfy the acquisition conditions, from the storage apparatus 70 while measuring the time taken to acquire each object OBJ (FIG. 8(d), (e)). The offline diagnosis section 46 stores the measured acquisition time in "the object-based acquisition time" area of the row area corresponding to the number of acquired sessions in the diagnosis information table 56 (FIG. 8(f), (g)). For example, the acquired objects OBJ are discarded without being held in the memory 50 or the like.

Next, with reference to the object information table 54 and session information table 52, the offline diagnosis section 46 calculates storage positions in the storage apparatus 70, of all the sessions SSN that satisfy the acquisition conditions. The offline diagnosis section 46 sequentially acquires the sessions SSN that satisfy the acquisition conditions, from the storage apparatus 70 and measures the acquisition time taken to acquire the sessions SSN (FIG. 8(h), (i)). The offline diagnosis section 46 stores the measured acquisition time in "the session-based acquisition time" field of the row area corresponding to the number of acquired sessions in the diagnosis information table 56 (FIG. 8(j), (k)). For example, the acquired sessions SSN are discarded without being held in the memory 50 or the like.

Figure 10:
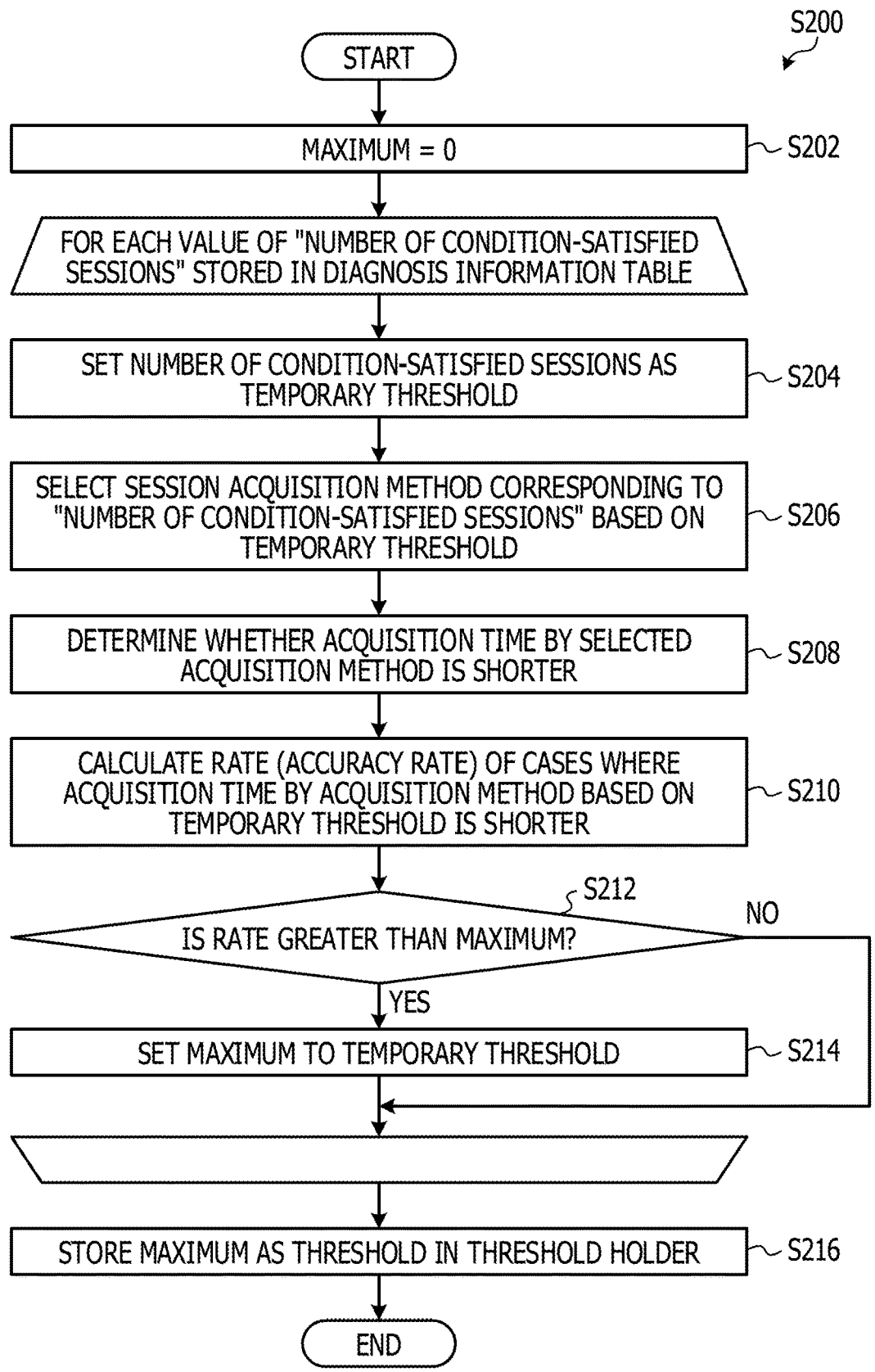
FIG. 10 is a diagram illustrating an example of the process in step S200 illustrated in FIG. 9.

The offline diagnosis section 46 then calculates the threshold based on the information stored in the diagnosis information table 56 and stores the calculated threshold in the threshold holder 58 (FIG. 8(l), (m)). FIG. 10 illustrates an operation example of calculating the threshold.

FIG. 9 illustrates an operation example of the offline diagnosis section 46 illustrated in FIG. 3. FIG. 9 illustrates an example of the data acquisition control program 62 executed by the capture server 40 illustrated in FIG. 3. The operation illustrated in FIG. 9 starts upon reception of a diagnosis start instruction from the management apparatus 80. The offline diagnosis section 46 executing the process in steps S102 to S112 is an example of the measurement section, and the offline diagnosis section 46 executing the process in step S200 is an example of the setting section.

First, in step S102, the offline diagnosis section 46 uses the session information table 52 to search for sessions SSN that satisfy the acquisition conditions and calculates the number of sessions SSN that satisfy the acquisition conditions, in each object OBJ. Next, in step S104, the offline diagnosis section 46 stores the number of sessions calculated for each object OBJ, in the diagnosis information table 56 and moves the process to step S106.

Steps S106 to S112 are executed for all the objects OBJ including the sessions SSN that satisfy the acquisition conditions. In step S106, the offline diagnosis section 46 uses the object information table 54 to acquire one of the objects OBJ including the sessions SSN that satisfy the acquisition conditions, from the storage apparatus 70. Then in step S108, the offline diagnosis section 46 stores in the diagnosis information table 56, the time taken to acquire the object OBJ in the step S106.

Then in step S110, the offline diagnosis section 46 sequentially acquires a predetermined number of sessions SSN included in one of the objects OBJ including the sessions SSN that satisfy the acquisition conditions, from the storage apparatus 70. The acquisition of the sessions SSN from the storage apparatus 70 is executed using the object information table 54 and session information table 52. Next, in step S112, the offline diagnosis section 46 stores the sum of the acquisition time of each session SSN in the diagnosis information table 56.

When the process in steps S106 to S112 is executed for all the objects OBJ including the sessions SSN that satisfy the acquisition conditions, the process in step S200 is executed. In step S200, the offline diagnosis section 46 calculates the threshold based on the information stored in the diagnosis information table 56 and stores the calculated threshold in the threshold holder 58, thus terminating the process illustrated in FIG. 9. FIG. 10 illustrates an example of the process in step S200.

FIG. 10 illustrates an example of the process in step S200 illustrated in FIG. 9. In step S200, the offline diagnosis section 46 sets the maximum value used to calculate the threshold to 0 and moves the process to step S204.

Steps S204 to S212 are executed for each value of "the number of sessions that satisfy acquisition conditions" stored in the diagnosis information table 56. In step S204, the offline diagnosis section 46 sets "the number of sessions that satisfy acquisition conditions" stored in the diagnosis information table 56 as a temporary threshold. Next, in step S206, the offline diagnosis section 46 selects the method of acquiring sessions SSN corresponding to each value of "the number of sessions that satisfy acquisition conditions" based on the temporary threshold.

Next, in step S208, the offline diagnosis section 46 determines whether the acquisition time of sessions SSN by the acquisition method selected in step S206 is shorter than that by the other unselected acquisition method. Next, in step S210, the offline diagnosis section 46 calculates the rate of the cases where the acquisition time of sessions SSN by the acquisition method selected in step S206 is shorter that by the other acquisition method (accuracy rate).

Next, in step S212, when the rate (accuracy rate) calculated in step S210 is greater than the maximum value, the offline diagnosis section 46 moves the process to step S214. When the rate (accuracy rate) calculated in step S210 is not greater than the maximum value, the offline diagnosis section 46 returns the process to step S204.

In step S214, the offline diagnosis section 46 sets the temporary threshold set in step S204 in the maximum value and returns the process to step S204. When the process in steps S204 to S212 is completed for each value of the "number of sessions that satisfy acquisition conditions" stored in the diagnosis information table 56, the offline diagnosis section 46 moves the process to step S216. By executing the process in steps S204 to S214 with the temporary threshold sequentially setting to the values of "the number of sessions that satisfy acquisition conditions" stored in the diagnosis information table 56, it is possible to calculate a temporary threshold with the highest accuracy rate. In step S216, the offline diagnosis section 46 stores the maximum value, which is the temporary threshold with the highest accuracy rate, as the threshold in the threshold holder 58 (FIG. 3) and terminates the process illustrated in FIG. 10.

Figure 11:
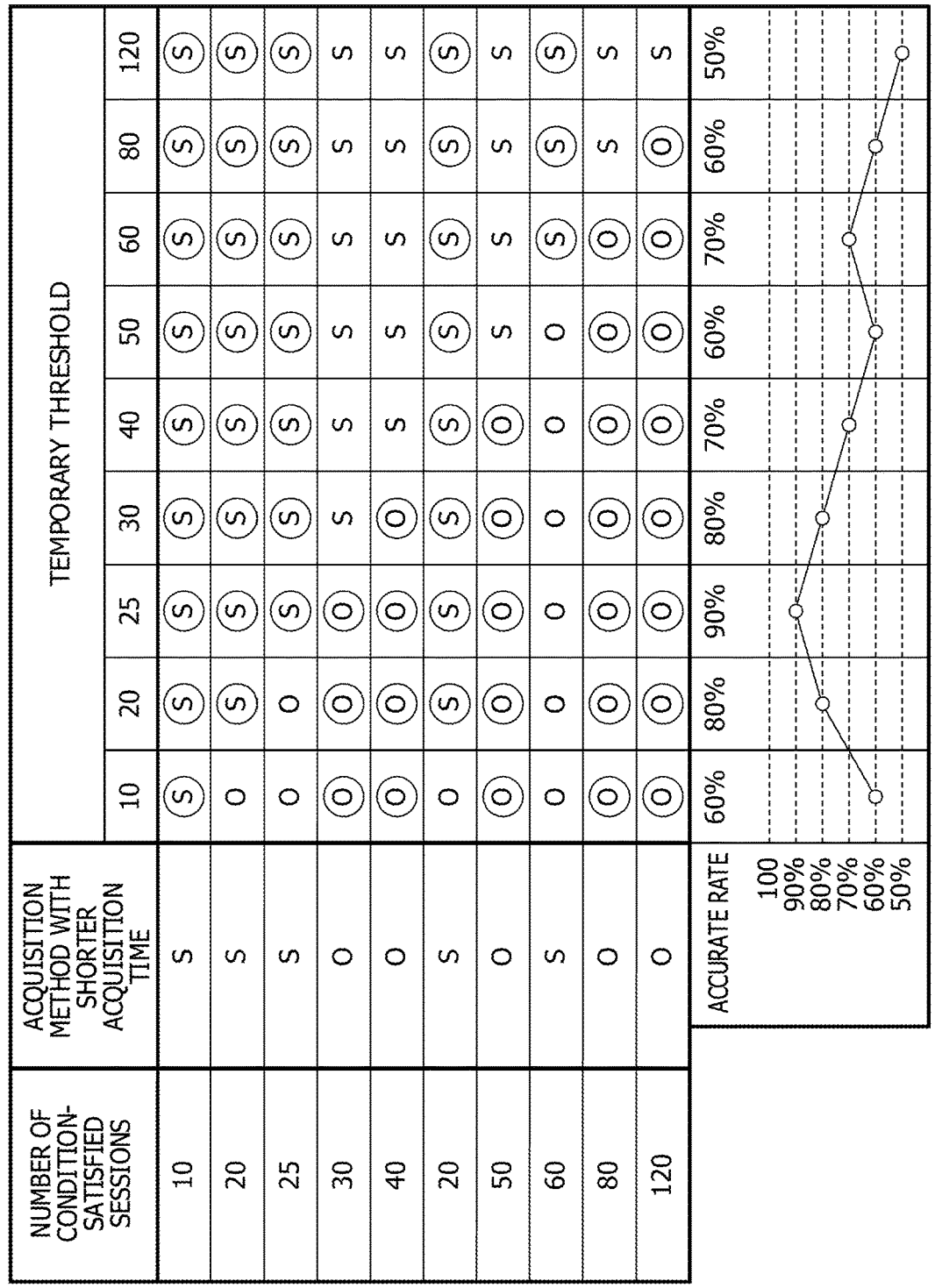
FIG. 11 is a diagram illustrating an example of the method of calculating a threshold in step S200 illustrated in FIG. 9.

FIG. 11 illustrates an example of the method of calculating the threshold in step S200 illustrated in FIG. 9. In FIG. 11, the values stored in "the number of sessions that satisfy acquisition conditions" fields are the same as those stored in the "number of sessions that satisfy acquisition conditions" fields of the diagnosis information table 56 illustrated in FIG. 5.

In FIG. 11, the acquisition method with the shorter acquisition time among the object-based and session-based acquisition times stored in the diagnosis information table 56 illustrated in FIG. 5 is indicated by symbols O or S in the "the acquisition method with shorter acquisition time" fields, respectively. The symbols O indicate that the object-based acquisition time is shorter than the session-based acquisition time. The symbols S indicate that the session-based acquisition time is shorter than the object-based acquisition time. In other words, the acquisition method with the underlined acquisition time in the diagnosis information table 56 illustrated in FIG. 5 is indicated with symbols O or S.

In FIG. 11, the area corresponding to the temporary threshold indicates whether to acquire the same number of sessions SSN as indicated by "the number of sessions that satisfy acquisition conditions" with the object-based acquisition method (indicated by symbols O) or the session-based acquisition method (indicated by symbols S) based on each value of the temporary threshold set in step S204 of FIG. 10. The circled symbols indicate that the corresponding acquisition method agrees with the acquisition method in "the acquisition method with shorter acquisition time" field. The accuracy rate corresponding to each value of the temporary threshold indicates the ratio of the number of circled symbols (acquisition method) to the number of values of "the number of sessions that satisfy acquisition conditions" (the number of rows). In the example illustrated in FIG. 11, the threshold is set to the temporary threshold with the highest accuracy rate (=25).

FIG. 12 illustrates an operation example of the session acquisition section 44 illustrated in FIG. 3. In other words, FIG. 12 illustrates an example of the data acquisition control program 62 executed by the capture server 40 illustrated in FIG. 3. The session acquisition section 44 starts the process illustrated in FIG. 12 upon receiving a request to acquire sessions SSN from the management apparatus 80. Steps S402 to S408 are executed for each object OBJ including the sessions SSN that satisfy the acquisition conditions included in the acquisition request. Before starting the process in step S402, the session acquisition section 44 searches for the target sessions SSN and the objects OBJ including the target sessions SSN with reference to the session information table 52 and object information table 54.

In step S402, the session acquisition section 44 determines whether the number of sessions SSN to be acquired in the object OBJ including the target sessions SSN is greater than the threshold. When the number of sessions SSN is greater than the threshold, the process moves to step S404. When the number of sessions SSN is not greater than the threshold, the process moves to step S408.

In step S404, the session acquisition section 44 acquires the whole object OBJ from the storage apparatus 70. Next, in step S406, the session acquisition section 44 extracts sessions SSN that satisfy the acquisition conditions, from the acquired object OBJ and returns the process to step S402. On the other hand, in step S408, the session acquisition section 44 acquires the sessions SSN from the storage apparatus 70 on a session-by-session basis and returns the process to step S402.

When the process in steps S402 to S408 is executed for each object OBJ including the sessions SSN that satisfy the acquisition conditions, the process moves to step S410. In step S410, the session acquisition section 44 transmits the acquired sessions SSN to the management apparatus 80 and terminates the process illustrated in FIG. 12. The session acquisition section 44 may transmit the acquired sessions SSN to the management apparatus 80 at each acquisition of the sessions SSN on an object-by-object bases or each acquisition of the sessions SSN on a session-by-session basis.

As described above, in the embodiment illustrated in FIGS. 3 to 12, similarly to the embodiment illustrated in FIGS. 1 and 2, the threshold as an index indicating whether to acquire data that satisfy the acquisition conditions on an object-by-object basis or on a session-by-session basis is set as the acquisition method criterion. Changing the method of acquiring data based on the threshold for each object OBJ allows for more efficient acquisition of data from the storage apparatus 70 than in the case where the acquisition method is not changed, improving the processing performance of the information processing system 100A.

The embodiment illustrated in FIGS. 3 to 12 further provides the following effect. The number of sessions stored in the diagnosis information table 56 is set as the temporary threshold, and the temporary threshold with the highest accuracy rate is set as the threshold. The threshold may be therefore statistically calculated even if the tendency of changes in acquisition time varies with respect to changes in the number of sessions. Still furthermore, the offline diagnosis section 46 operates during the non-capture mode in which packets are not captured from the mirror ports 2d, 2e. This allows for calculation of the threshold without being influenced by the operation of the capture controller 42 capturing packets. Still furthermore, the offline diagnosis section 46 operates during the non-acquisition mode in which the management apparatus 80 does not issue any acquisition request. This allows for calculation of threshold without being influenced by the operation of the session acquisition section 44 acquiring sessions SSN.

Figure 13:
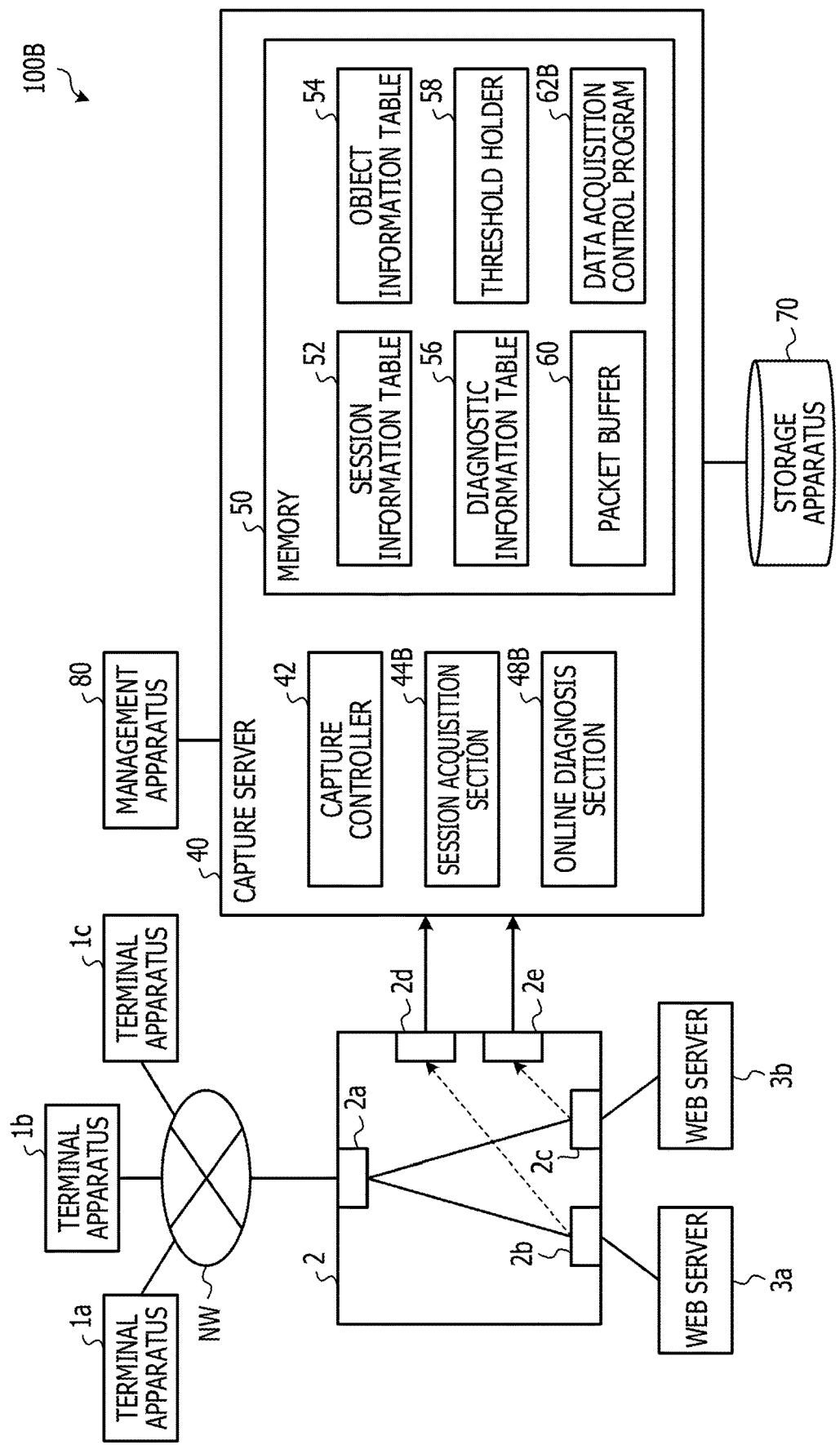
FIG. 13 is a diagram illustrating still another embodiment of the information processing apparatus, information processing system, and program.

FIG. 13 illustrates another embodiment of the information processing apparatus, information processing system, and program. The same or similar components thereof as those of FIG. 3 are given the same reference numerals, and detailed description thereof is omitted. Similarly, to the information processing system 100A illustrated in FIG. 3, an information processing system 100B illustrated in FIG. 13 includes: the capture server 40 connected to the management apparatus 80 and storage apparatus 70. The capture server 40 captures packets exchanged between the terminal apparatuses 1 and web servers 3 through the mirror ports 2d, 2e and stores the captured packets in the storage apparatus 70.

The capture server 40 includes a session acquisition section 44B instead of the session acquisition section 44 illustrated in FIG. 3 and includes an online diagnosis section 48B instead of the offline diagnosis section 46 illustrated in FIG. 3. The memory 50 in the capture server 40 stores a data acquisition control program 62B implementing the functions of the capture controller 42, session acquisition section 44B, and online diagnosis section 48B. The functions of the capture controller 42, session acquisition section 44B, and online diagnosis section 48B may be implemented with hardware.

The session acquisition section 44B includes the function of notifying the online diagnosis section 48B of the number of acquired sessions SSN from the objects OBJ and the time taken to acquire the sessions SSN from the storage apparatus 70 in addition to the functions of the session acquisition section 44 illustrated in FIG. 3. The online diagnosis section 48B operates during a capture mode in which the capture controller 42 captures packets and during an acquisition mode in which the management apparatus 80 issues an acquisition. The online diagnosis section 48B stores the time taken to acquire sessions SSN and the like, in the diagnosis information table 56. The online diagnosis section 48B may also operate during non-capture mode in which the capture controller 42 does not capture packets and during the acquisition mode in which the management apparatus 80 issues an acquisition request. The operation example of the online diagnosis section 48B is illustrated in FIGS. 15 to 18.

FIG. 14 illustrates an example of information stored in the diagnosis information table 56 illustrated in FIG. 13. Similarly, to the diagnosis information table 56 illustrated in FIG. 5, the diagnosis information table 56 illustrated in FIG. 13 includes plural row areas each storing "the number of sessions that satisfy acquisition conditions", "the object-based acquisition time", and "the session-based acquisition time". The diagnosis information table 56 illustrated in FIG. 14 stores any one of the object-based acquisition time and session-based acquisition time in the row corresponding to "the number of sessions that satisfy acquisition conditions".

Figure 15:
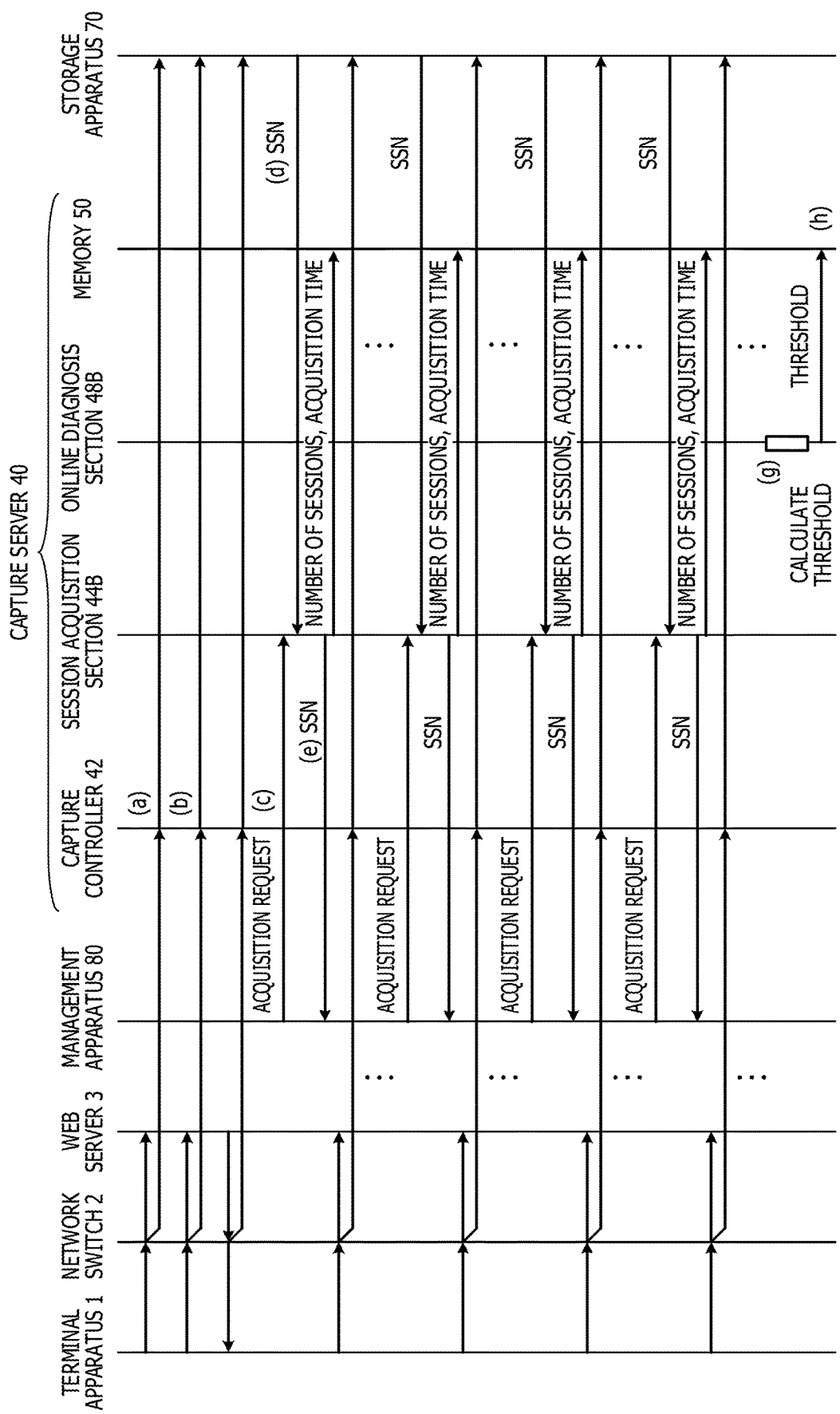
FIG. 15 is a diagram illustrating an operation example of a capture server illustrated in FIG. 13, in a capture mode.

FIG. 15 illustrates an operation example of the capture server 40 illustrated in FIG. 13 in the capture mode. In the capture mode, the capture controller 42 of the capture server 40 captures packets exchanged between the terminal apparatuses 1 and web servers 3 through the network switch 2 and stores the captured packets in the storage apparatus 70 (FIG. 15(a), (b)). As described in FIG. 6, the capture controller 42 classifies the received packets into sessions SSN and stores the objects OBJ each including a certain number of sessions SSN, in the storage apparatus 70.

Figure 17:
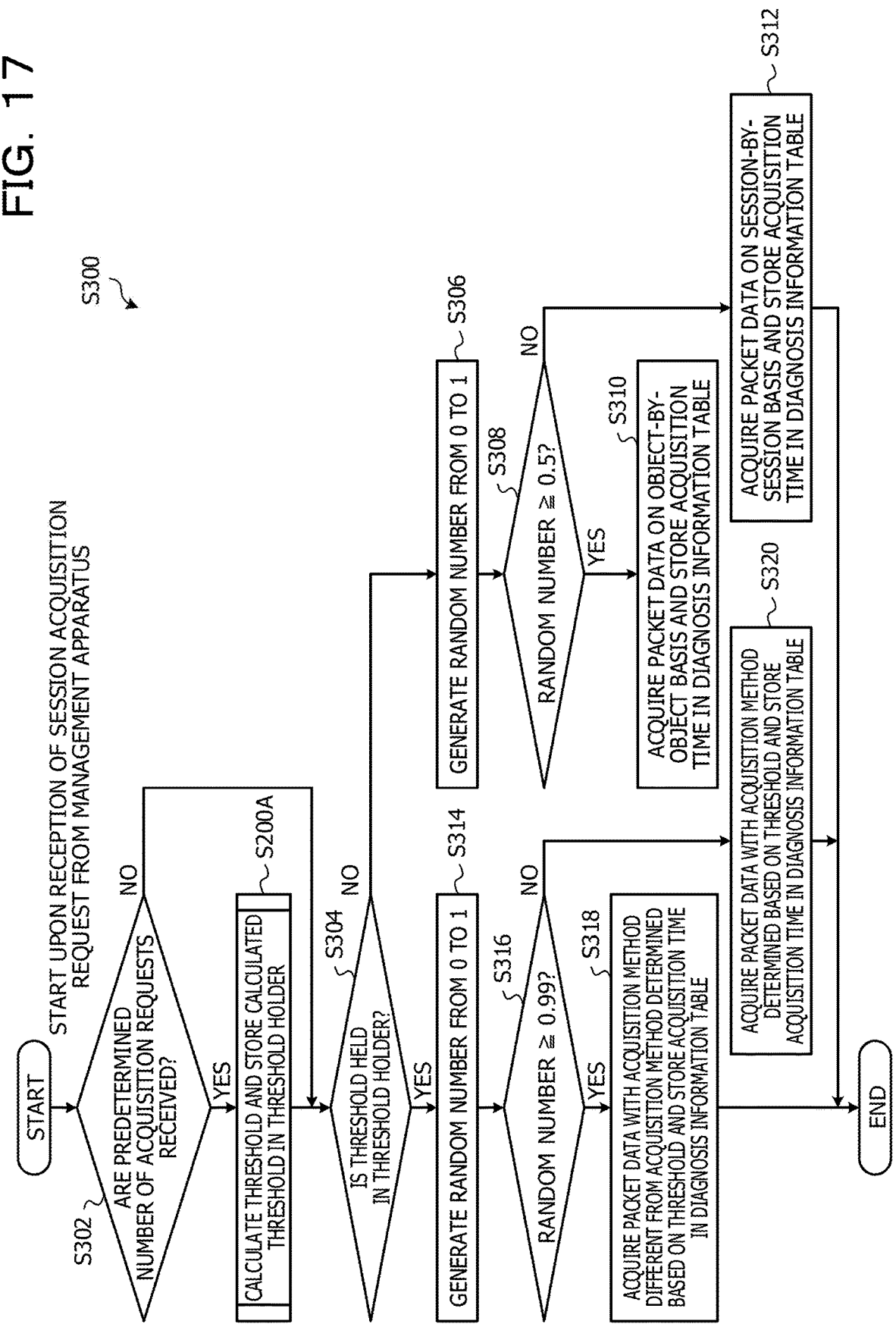
FIG. 17 is a diagram illustrating an operation example of an online diagnosis section and the session acquisition section illustrated in FIG. 13.

Upon receiving each request to acquire sessions SSN, from the management apparatus 80, the session acquisition section 44B acquires the sessions SSN that satisfy the acquisition conditions included in the acquisition request, from the storage apparatus 70 on an object-by-object basis or on a session-by-session basis (FIG. 15(c), (d)). The session acquisition section 44B measures the time taken to acquire the sessions SSN. The session acquisition section 44B transmits the acquired sessions SSN to the management apparatus 80 (FIG. 15(e)). The session acquisition section 44B stores the object-based or session-based acquisition time of session SSN in the diagnosis information table 56 in relation to the number of target sessions in the object OBJ including the target sessions SSN (FIG. 15(f)). FIG. 17 illustrates which is selected by the session acquisition section 44B to acquire target sessions SSN from the storage apparatus 70, from the object-based and session-based acquisition methods.

The online diagnosis section 48B calculates the threshold based on the information stored in the diagnosis information table 56 and stores the calculated threshold in the threshold holder 58 each time the session acquisition section 44B receives a predetermined number of requests to acquire sessions SSN (FIG. 15(g), (h)). For example, the session acquisition section 44B counts the number of acquisition requests. When the count reaches the predetermined number, the session acquisition section 44B issues a request to calculate the threshold to the online diagnosis section 48B. The online diagnosis section 48B calculates the threshold based on the calculation request from the session acquisition section 44B.

As described above, the capture server 40 is able to calculate and update the threshold during the capture mode in which the capture server 40 captures through the network switch 2, packets exchanged between the terminal apparatuses 1 and web servers 3. In other words, the capture server 40 reflects the information of the packets captured through the network switch 2 on the threshold in real time. The capture server 40 is also able to calculate and update the threshold during the acquisition mode in which the management apparatus 80 issues an acquisition request. The capture server 40 is therefore able to calculate the threshold without suspending the capture operation and the operation to acquire target sessions, as the original functions of the capture server 40.

Figure 16:
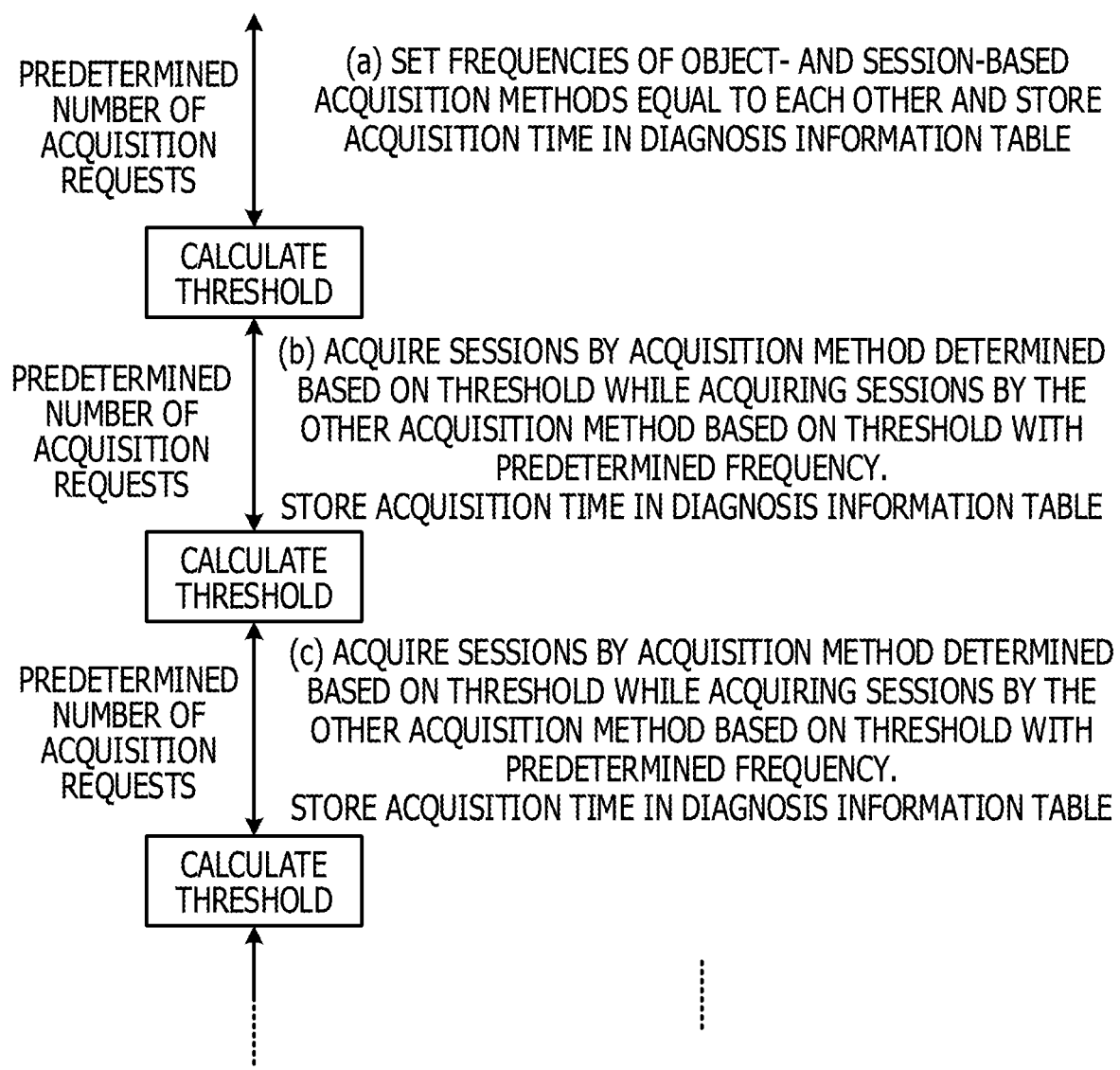
FIG. 16 is a diagram illustrating an operation example for changing the session acquisition method by a session acquisition section illustrated in FIG. 13.

FIG. 16 illustrates an operation example in which the session acquisition section 44B illustrated in FIG. 13 changes the method of acquiring sessions SSN. When the threshold holder 58 does not hold the threshold, based on the predetermined number of acquisition requests, the session acquisition section 44B causes the object-based acquisition method and the session-based acquisition method to be selected with the same frequency (FIG. 16(a)). Specifically, when the online diagnosis section 48B has never calculated the threshold, the session acquisition section 44B sets the frequencies of the object-based acquisition method and the session-based acquisition method equal to each other. The online diagnosis section 48B stores the time taken to acquire the sessions SSN, in the diagnosis information table 56.

When the session acquisition section 44B acquires sessions SSN in response to the predetermined number of acquisition requests, the online diagnosis section 48B calculates the threshold based on the information held in the diagnosis information table 56 and stores the calculated threshold in the threshold holder 58.

The session acquisition section 44B determines the acquisition method based on the threshold held by the threshold holder 58 and acquires the sessions SSN using the acquisition method determined using the threshold (FIG. 16(b), (c)). The session acquisition section 44B acquires the sessions SSN with the different acquisition method from the acquisition method determined using the threshold, at with predetermined frequency. The online diagnosis section 48B stores the time taken to acquire the sessions SSN, in the diagnosis information table 56.

FIG. 17 illustrates an operation example of the online diagnosis section 48B and session acquisition section 44B illustrated in FIG. 13. FIG. 17 specifically illustrates an example of the data acquisition control program 62B executed by the capture server 40 illustrated in FIG. 13. The process illustrated in FIG. 17 starts upon reception of the request to acquire sessions SSN from the management apparatus 80.

Figure 18:
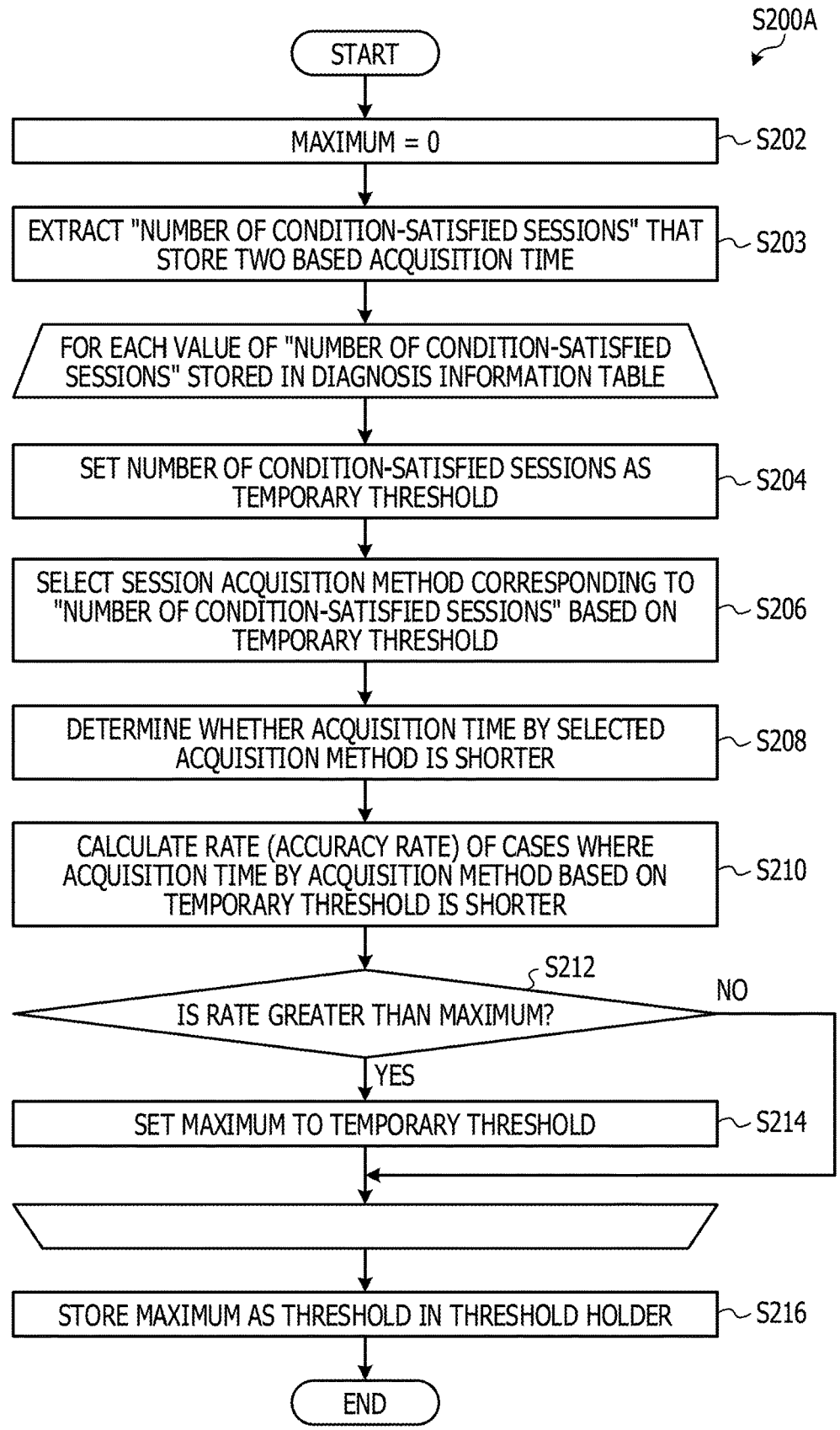
FIG. 18 is a diagram illustrating an example of the process in step S200A illustrated in FIG. 17.

In step S302, when having received the predetermined number of acquisition requests, the session acquisition section 44B causes the online diagnosis section 48B to execute the process in step S200A. When not having received the predetermined number of acquisition requests, the session acquisition section 44B moves the process to step S304. When having received the predetermined number of acquisition requests, the session acquisition section 44B resets the counter for the number of acquisition requests to 0. In step S200A, the online diagnosis section 48B calculates the threshold and stores the calculated threshold in the threshold holder 58. The online diagnosis section 48B then causes the session acquisition section 44B to execute the process in step S304. An example of the process in step S200A is illustrated in FIG. 18.

In step S304, when the threshold is held in the threshold holder 58, the session acquisition section 44B moves the process to step S314. When the threshold is not held in the threshold holder 58, the session acquisition section 44B moves the process to step S306. In step S306, the session acquisition section 44B generates a random number from 0 to 1.

Next, in step S308, when the generated random number is not less than 0.5, the session acquisition section 44B moves the process to step S310. When the generated random number is less than 0.5, the session acquisition section 44B moves the process to step S312. In step S310, the session acquisition section 44B acquires the sessions SSN on an object-by-object basis and transmits the acquired sessions SSN to the management apparatus 80. The session acquisition section 44B stores the acquisition time in the diagnosis information table 56 in relation to the number of acquired sessions SSN and terminates the process. In step S312, the session acquisition section 44B acquires the sessions SSN on a session-by-session basis and transmits the acquired sessions SSN to the management apparatus 80. The session acquisition section 44B stores the acquisition time in the diagnosis information table 56 in relation to the number of acquired sessions SSN and terminates the process. When the threshold holder 58 does not hold the threshold, the object-based acquisition method and session-based acquisition method are carried out with the same frequency.

On the other hand, in step S314, the session acquisition section 44B generates a random number from 0 to 1. Next, in step S316, when the generated random number is not less than 0.99, for example, the session acquisition section 44B moves the process to step S318. When the generated random number is less than 0.99, the session acquisition section 44B moves the process to step S320. The random number may be judged in step S314 with a value other than 0.99.

In step S318, the session acquisition section 44B acquires the sessions SSN with the different acquisition method from the acquisition method determined using the threshold and transmits the acquired sessions SSN to the management apparatus 80. The session acquisition section 44B stores the acquisition time in the diagnosis information table 56 in relation to the number of acquired sessions SSN and terminates the process. In step S320, the online diagnosis section 48B acquires sessions SSN with the acquisition method determined using the threshold and transmits the acquired sessions SSN to the management apparatus 80. The session acquisition section 44B stores the acquisition time in the diagnosis information table 56 in relation to the number of acquired sessions SSN and terminates the process.

In such a manner, when the threshold is held in the threshold holder 58, acquisition of sessions SSN is carried out using the different acquisition method from the acquisition method determined using the threshold with a frequency of 1%. As illustrated in the diagnosis information table 56 in FIG. 14, therefore, both the object-based acquisition time and session-based acquisition time are obtained for "the number of sessions that satisfy acquisition conditions" (10, 20, 40, for example). This allows the online diagnosis section 48B to calculate the threshold using the object-based acquisition time and session-based acquisition time. Herein, the likelihood of acquisition of sessions SSN with the acquisition method different from the acquisition method determined using the threshold is set to 1%. This may minimize the influence of a decrease in efficiency at acquiring sessions SSN. The online diagnosis section 48B executing the process in step S200A is an example of the setting section, and the session acquisition section 44B executing the process in steps S310, S312, S318, and S320 is an example of the measurement section and acquisition section.

FIG. 18 illustrates an example of the process in step S200A illustrated in FIG. 17. The process in FIG. 18 is the same as that illustrated in FIG. 10 except further including step S203 after step S202. In step S203, the online diagnosis section 48B extracts "the number of sessions that satisfy acquisition conditions" in the row area that stores both the object-based acquisition time and session-based acquisition time. Using "the number of sessions that satisfy acquisition conditions" extracted in step S203, the process in steps S204 to S214 is executed in a similar manner to FIG. 10.

The capture server 40 illustrated in FIG. 13 may include the offline diagnosis section 46 illustrated in FIG. 3 together with the online diagnosis section 48B. In this case, the capture server 40 selectively activates one of the online diagnosis section 48B and offline diagnosis section 46 based on the instruction from the management apparatus 80 to calculate the threshold. This allows for calculation of the threshold in either the capture mode in which packets are captured or the non-capture mode in which packets are not captured. Furthermore, the threshold may be calculated in either the acquisition mode in which the management apparatus 80 issues acquisition requests or the non-acquisition mode in which the management apparatus 80 does not issue acquisition requests.

Hereinabove, in the embodiments illustrated in FIGS. 13 to 18, similarly to the embodiments illustrated in FIGS. 1 to 12, the threshold as an index indicating whether to acquire data that satisfy the acquisition conditions on an object-by-object basis or on a session-by-session basis is set as the acquisition method criterion. This may increase the efficiency at acquisition of data from the storage apparatus 70, thus improving the processing performance of the information processing system 100B. Furthermore, the threshold is set based on the temporary threshold. The threshold is therefore statistically calculated even if the tendency of changes in acquisition time varies with respect to changes in the number of sessions.

Furthermore, in the embodiment illustrated in FIGS. 13 to 18, the threshold may be calculated during the capture mode in which packets are captured through the network switch 2 and also may be calculated during the acquisition mode in which the management apparatus 80 issues acquisition requests. The capture server 40 is therefore able to calculate the threshold without suspending the capture operation and the operation to acquire target sessions to be acquired, which are the original functions of the capture server 40.

When the threshold is not set in the capture server 40, acquisition of sessions SSN based on acquisition requests is carried out on an object-by-object basis and on a session-by-session basis with the same frequency. The information to set the threshold is thereby stored in the diagnosis information table 56. Even in the initial state of the capture server 40 where the threshold is not set, the capture server 40 is able to acquire target sessions SSN based on an acquisition request from the management apparatus 80.

After the threshold is set, the acquisition method different from the determination based on the threshold is selected with a predetermined frequency. The likelihood of measuring the times taken to acquire sessions SSN both on an object-by-object basis and a session-by-session basis with respect to the number of acquired sessions is therefore higher than that in the case where the measurement is carried out with only the acquisition method selected based on the threshold. In this embodiment, therefore, variations in number of sessions used to calculate the threshold (that is, the number of values of temporary threshold in step S204 illustrated in FIG. 18) may be increased compared with that in the case where the measurement of the acquisition time is carried out only for the acquisition method selected according to the threshold. This improves the accuracy of calculating the threshold.

Figure 19:
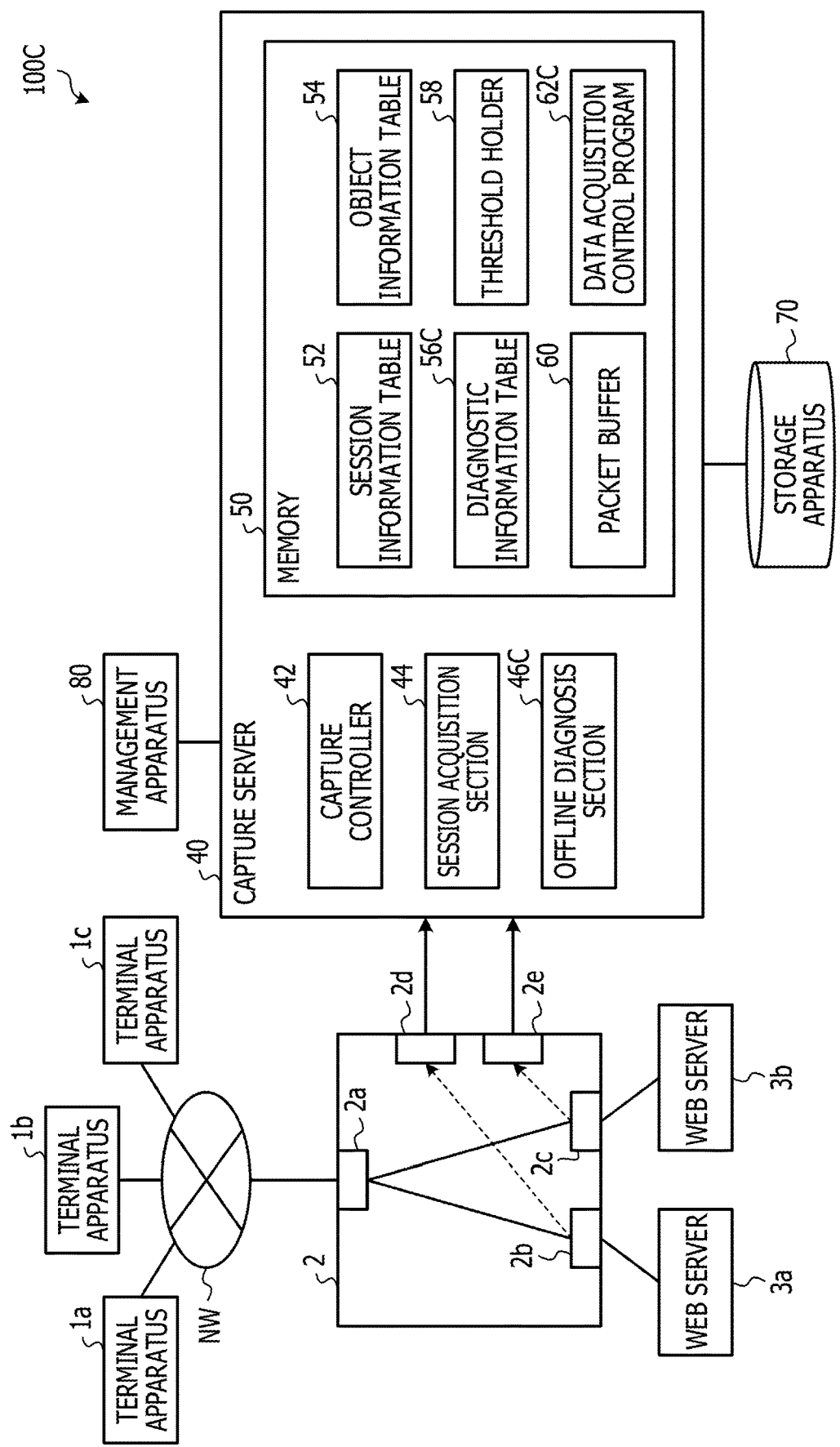
FIG. 19 is a diagram illustrating still another embodiment of the information processing apparatus, information processing system, and program.

FIG. 19 illustrates still another embodiment of the information processing apparatus, information processing system, and program. The same or similar components thereof as those of FIG. 3 are given the same reference numerals, and detailed description thereof is omitted. Similarly to the information processing system 100A illustrated in FIG. 3, an information processing system 100C illustrated in FIG. 19 includes: the capture server 40 connected to the management apparatus 80 and storage apparatus 70. The capture server 40 captures through the mirror ports 2d, 2e, packets exchanged between the terminal apparatuses 1 and web servers 3 and stores the captured packets in the storage apparatus 70.

The capture server 40 includes an offline diagnosis section 46C instead of the offline diagnosis section 46 illustrated in FIG. 3 and includes a diagnosis information table 56C instead of the diagnosis information table 56 illustrated in FIG. 3. FIG. 20 illustrates an example of the diagnosis information table 56C. The memory 50 stores a data acquisition control program 62C implementing the functions of the capture controller 42, session acquisition section 44, and offline diagnosis section 46C. The functions of the capture controller 42, session acquisition section 44, and offline diagnosis section 46C may be implemented by hardware.

Based on a diagnosis start instruction from the management apparatus 80, the offline diagnosis section 46C calculates the ratio of data amount of sessions SSN that satisfy the acquisition conditions in each object OBJ and stores the calculated ratio of data amount in the diagnosis information table 56C. The offline diagnosis section 46C measures the time taken to acquire the sessions SSN that satisfy the acquisition conditions, from the storage apparatus 70 on an object-by-object basis and the time taken to acquire the sessions SSN that satisfy the acquisition conditions from the storage apparatus 70 on a session-by-session basis. The offline diagnosis section 46C stores the object-based acquisition time and session-based acquisition time in relation to the calculated ratio of data amount in the diagnosis information table 56C. The offline diagnosis section 46C measuring the times taken to acquire target sessions SSN on an object-by-object basis and on a session-by-session basis is an example of the measurement section. The operation of the offline diagnosis section 46C is implemented by replacing the number of target sessions with the ratio of data amount in FIGS. 9 and 10. The offline diagnosis section 46C executing the process in step S200 of FIG. 9 is an example of the setting section.

The capture server 40 illustrated in FIG. 19 may include an online diagnosis section that calculates the threshold based on the information stored in the diagnosis information table 56C in response to an acquisition request from the management apparatus 80. The function of the online diagnosis section is the same as the function of the online diagnosis section 48B illustrated in FIG. 13 except calculating the threshold based on the ratio of data amount in step S200A illustrated in FIG. 17. The session acquisition section 44 illustrated in FIG. 19 includes a function of storing in the diagnosis information table 56C, information (the ratio of data amount, acquisition time) of the sessions SSN acquired from the storage apparatus 70 based on the acquisition request from the management apparatus 80. The session acquisition section 44 includes the function of steps S304 to S320 illustrated in FIG. 17. The session acquisition section 44 stores the acquisition time in the diagnosis information table 56C in relation to the ratio of data amount of the acquired sessions SSN in steps S310, S312, S318, and S320. Based on the instruction from the management apparatus 80, the capture server 40 selectively activates one of the offline diagnosis section 46C and the online diagnosis section to calculate the threshold.

FIG. 20 illustrates an example of the information stored in the diagnosis information table 56C illustrated in FIG. 19. Detailed description of the same components as those of the diagnosis information table 56 illustrated in FIG. 5 is omitted. The diagnosis information table 56C includes "the ratio of data amount of sessions that satisfy acquisition conditions" fields, instead of "the number of sessions that satisfy acquisition conditions" fields of the diagnosis information table 56 in FIG. 5. For example, the ratio of data "0.1" indicates that the ratio of data amount of target sessions SSN is 10% of the total data amount of an object OBJ including the target sessions SSN.

The diagnosis information table 56C illustrated in FIG. 20 may be provided for the information processing system 100B illustrated in FIG. 13. In FIG. 15, the session acquisition section 44B stores the time taken to acquire sessions SSN on an object-by-object basis or a session-by-session basis in relation to the ratio of data amount, instead of the number of sessions, in the diagnosis information table 56C. The online diagnosis section 48B calculates the threshold based on the information stored in the diagnosis information table 56C.

Hereinabove, in the embodiment illustrated in FIGS. 19 and 20, similarly to the embodiments illustrated in FIGS. 1 and 12, the threshold as an index indicating whether to acquire data that satisfy acquisition conditions on an object-by-object basis or on a session-by-session basis is set as the acquisition method criterion. Furthermore, the threshold is set based on the temporary threshold. This allows for the threshold to be statistically calculated even if the tendency of changes in acquisition time varies with respect to changes in the number of sessions. In the embodiment illustrated in FIGS. 19 and 20, the threshold is calculated based on the ratio of data amount of sessions SSN that satisfy the acquisition conditions.

Figure 21:
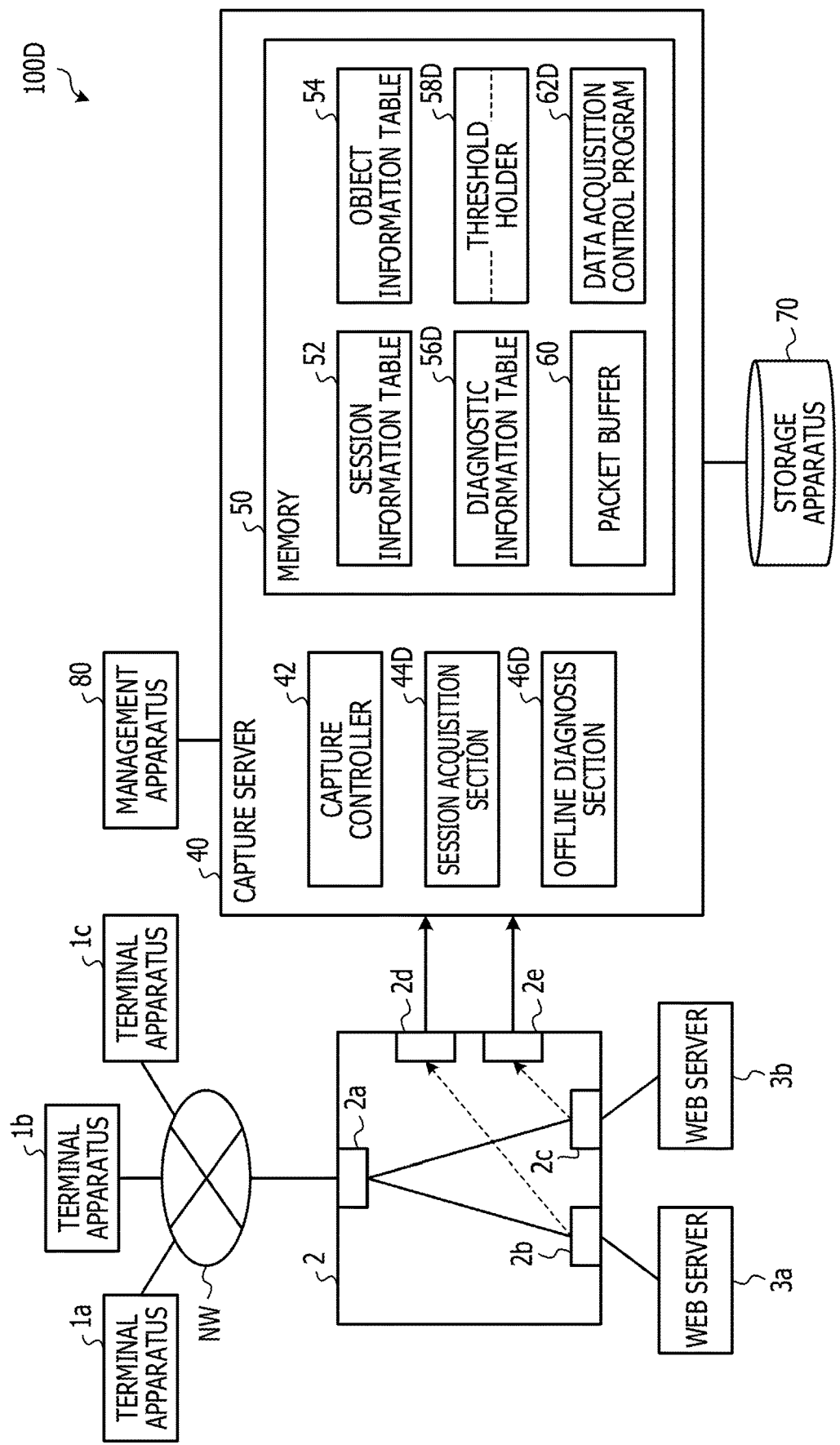
FIG. 21 is a diagram illustrating still another embodiment of the information processing apparatus, information processing system, and program.

FIG. 21 illustrates another embodiment of the information processing apparatus, information processing system, and program. The same or similar components thereof as those of FIG. 3 are given the same reference numerals, and detailed description thereof is omitted. Similarly to the information processing system 100A illustrated in FIG. 3, an information processing system 100D illustrated in FIG. 21 includes: the capture server 40 connected to the management apparatus 80 and storage apparatus 70. The capture server 40 captures packets exchanged between the terminal apparatuses 1 and web servers 3 through the mirror ports 2d, 2e and stores the captured packets in the storage apparatus 70.

The capture server 40 includes a session acquisition section 44D instead of the session acquisition section 44 illustrated in FIG. 3 and includes an offline diagnosis section 46D instead of the offline diagnosis section 46 illustrated in FIG. 3. The capture server 40 includes a diagnosis information table 56D instead of the diagnosis information table 56 illustrated in FIG. 3 and includes a threshold holder 58D instead of the threshold holder 58. FIG. 22 illustrates an example of the diagnosis information table 56D. The threshold holder 58D holds a first threshold and a second threshold. The memory 50 in the capture server 40 stores a data acquisition control program 62D implementing the functions of the capture controller 42, session acquisition section 44D, and offline diagnosis section 46D. The functions of the capture controller 42, session acquisition section 44D, and offline diagnosis section 46D may be implemented by hardware.

Figure 25:
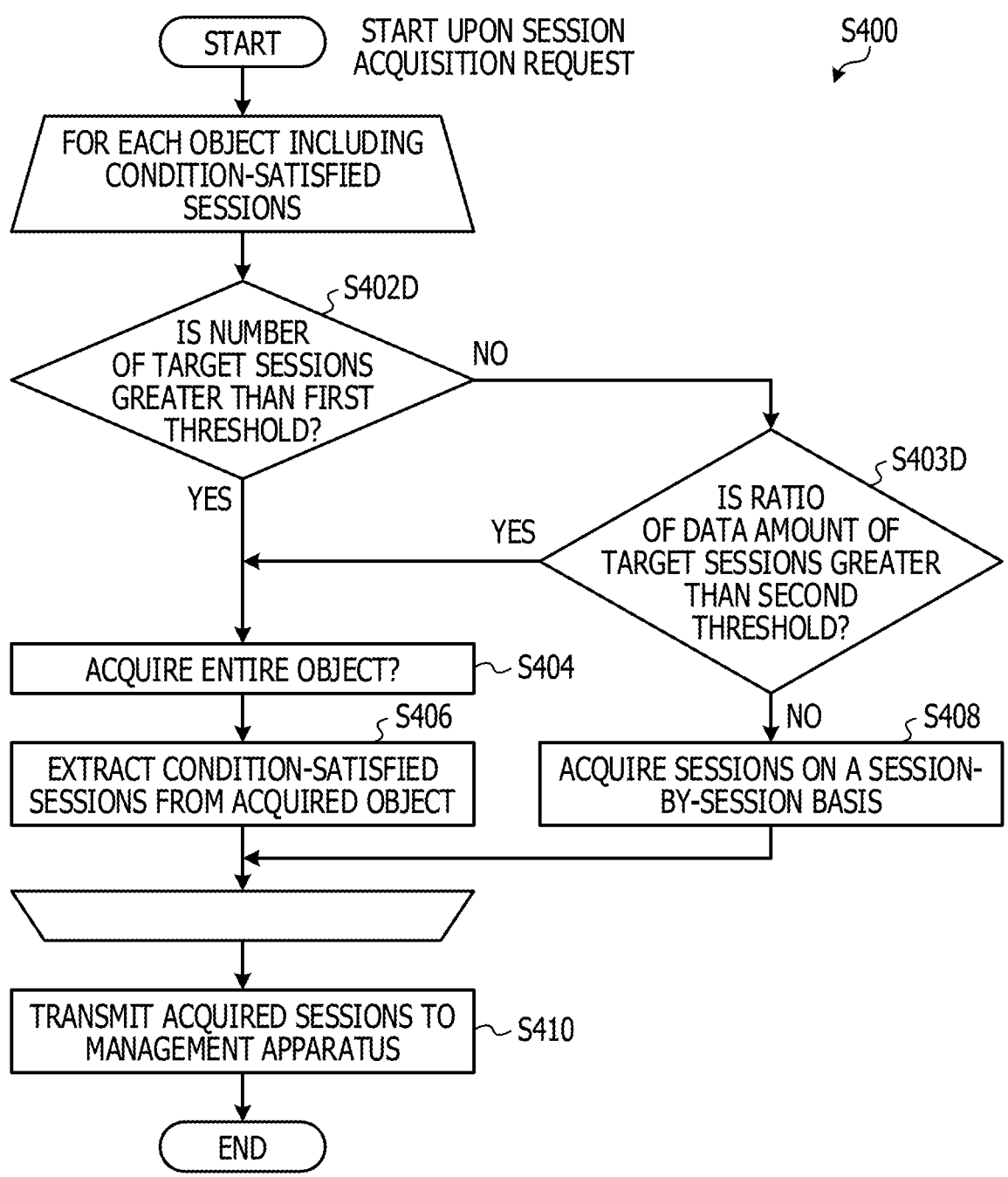
FIG. 25 is a diagram illustrating an operation example of a session acquisition section illustrated in FIG. 21.
Figure 26:
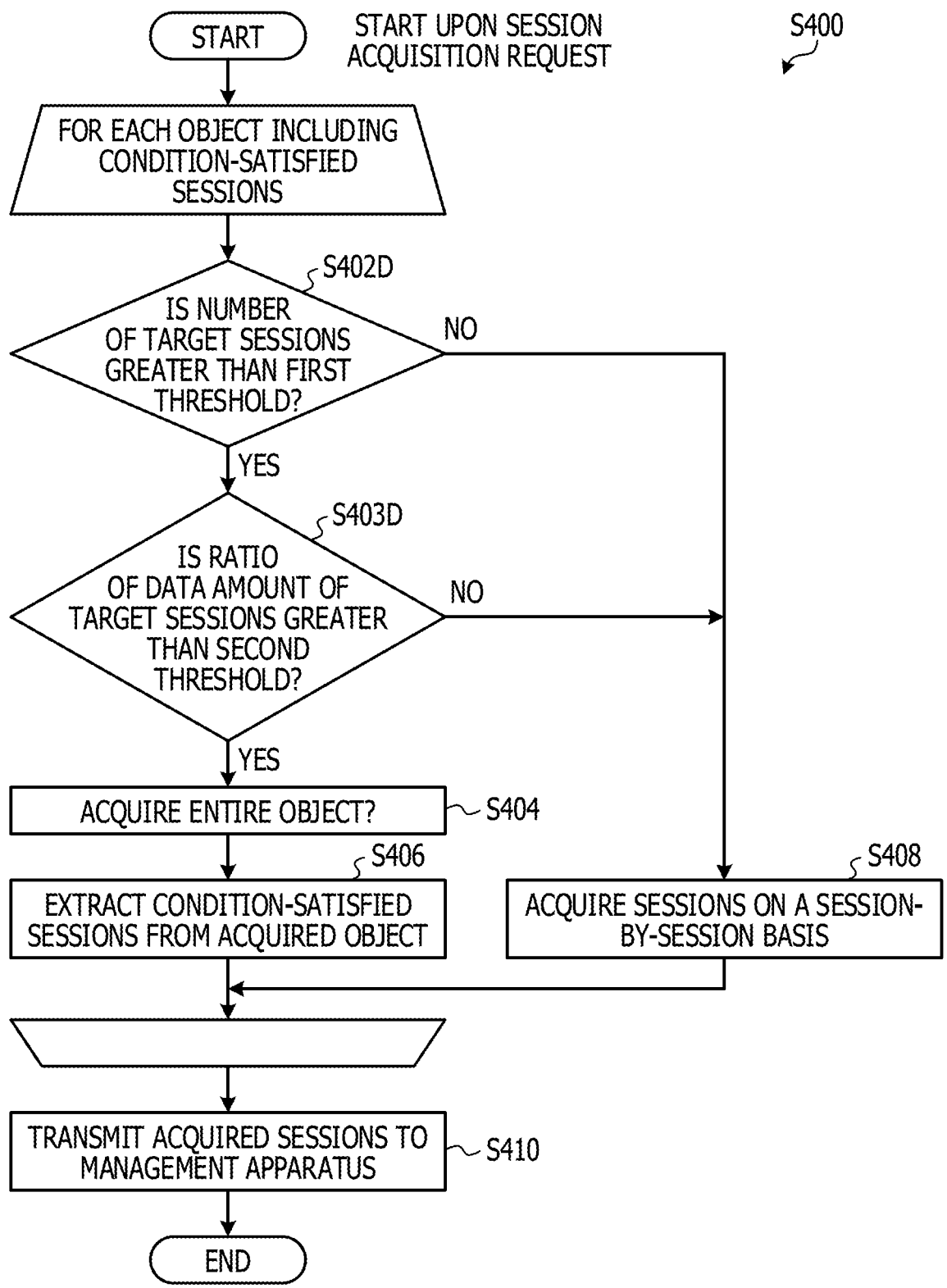
FIG. 26 is a diagram illustrating another operation example of the session acquisition section illustrated in FIG. 21.

Based on a request from the management apparatus 80 to acquire sessions SSN, the session acquisition section 44D acquires from the storage apparatus 70, sessions SSN that satisfy the acquisition conditions included in the acquisition request. Herein, for each object OBJ, the session acquisition section 44D compares the number of sessions that satisfy the acquisition conditions with the first threshold and compares the amount of data of sessions SSN that satisfy the acquisition conditions with the second threshold. Based on the results of comparisons, the session acquisition section 44D acquires the sessions SSN included in the object OBJ from the storage apparatus 70 on an object-by-object basis or on a session-by-session basis and transmits the acquired sessions SSN to the management apparatus 80. FIGS. 25 and 26 illustrate an operation example of the session acquisition section 44D. The session acquisition section 44D is an example of the acquisition section.

Based on a diagnosis start instruction, in a similar manner to the offline diagnosis section 46 illustrated in FIG. 3, the offline diagnosis section 46D calculates the number of sessions SSN that satisfy the acquisition conditions in each object OBJ and stores the calculated number of sessions in the diagnosis information table 56D. Based on a diagnosis start instruction, in a similar manner to the offline diagnosis section 46C illustrated in FIG. 19, the offline diagnosis section 46D calculates the ratio of data amount of sessions SSN that satisfy the acquisition conditions in each object OBJ and stores the calculated ratio of data amount in the diagnosis information table 56D. The offline diagnosis section 46D measures the time taken to acquire the sessions SSN that satisfy the acquisition conditions, from the storage apparatus 70 on an object-by-object basis and time taken to acquire the sessions SSN that satisfy the acquisition conditions from the storage apparatus 70 on a session-by-session basis and stores the measured acquisition time in the diagnosis information table 56D.

Figure 23:
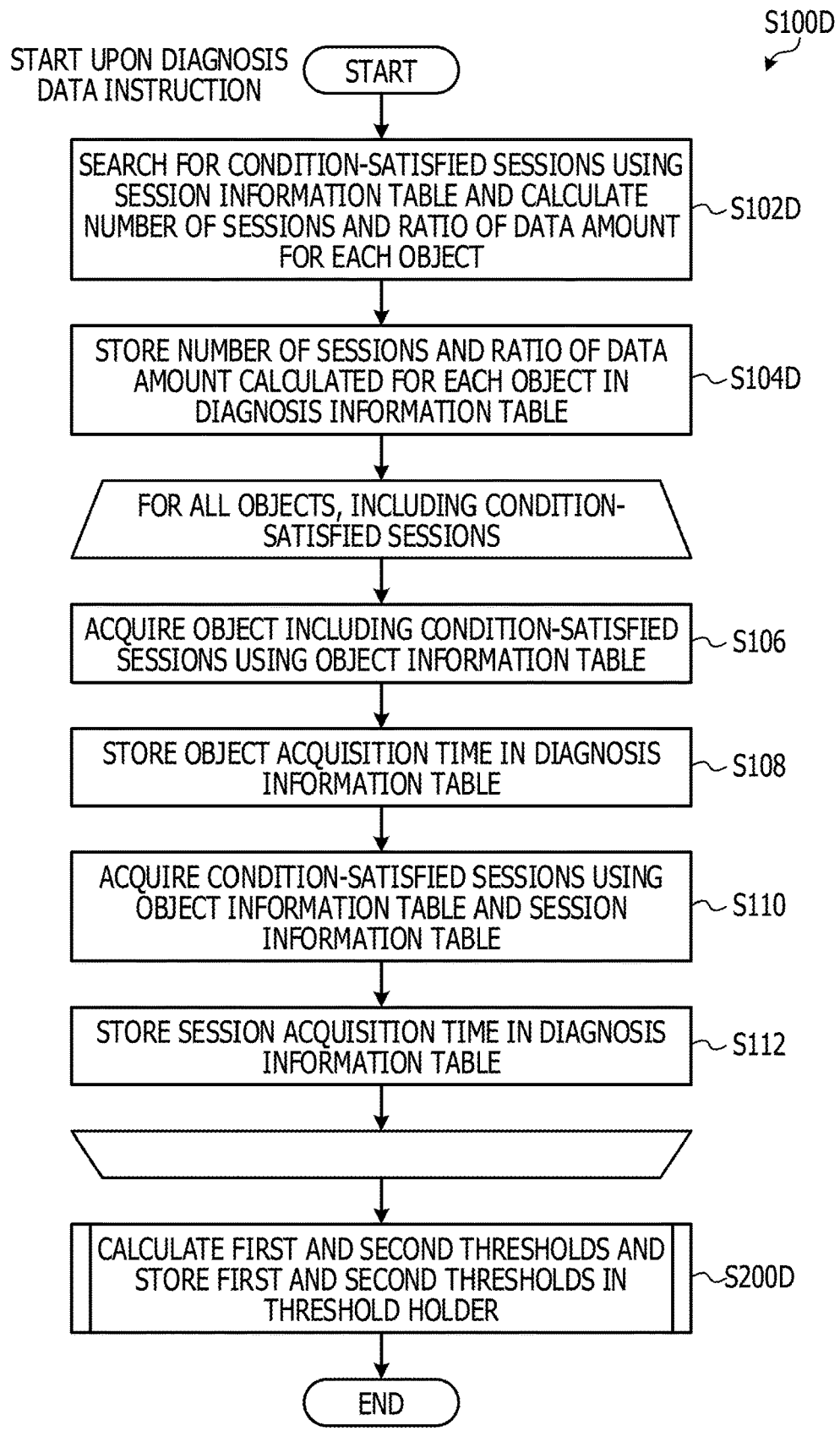
FIG. 23 is a diagram illustrating an operation example of an offline diagnosis section illustrated in FIG. 21.
Figure 24:
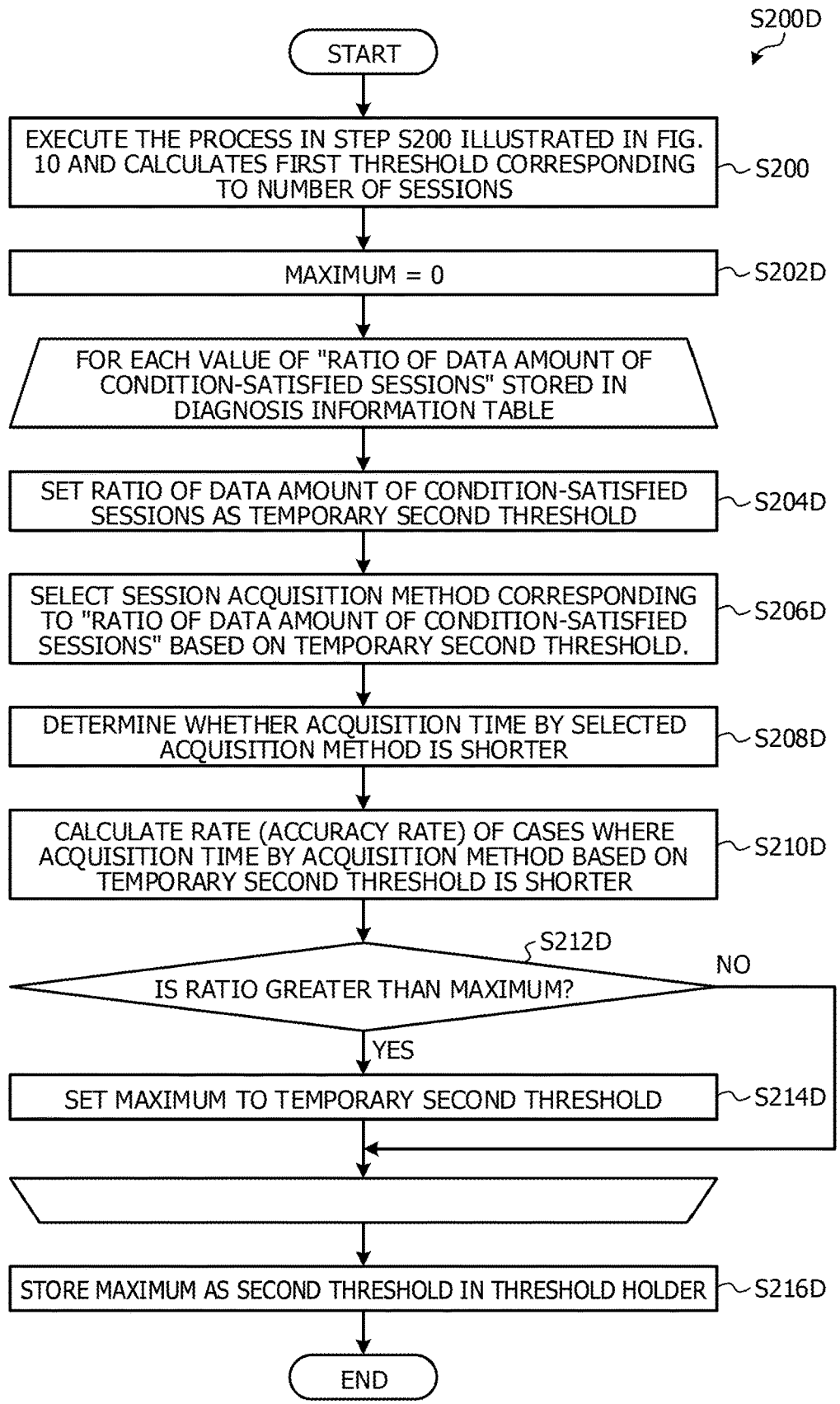
FIG. 24 is a diagram illustrating an example of the process in step S200D illustrated in FIG. 23.

The offline diagnosis section 46D calculates the first and second thresholds based on the information stored in the diagnosis information table 56D. The first threshold is the same as the threshold calculated based on the number of sessions stored in "the number of sessions that satisfy acquisition conditions" fields of the diagnosis information table 56 illustrated in FIG. 5. Specifically, the first threshold is calculated by the offline diagnosis section 46D based on the time taken to acquire the sessions SSN from the storage apparatus 70, that corresponds to the number of target sessions of each object OBJ. The second threshold is the same as the threshold calculated based on the ratio of data amount stored in "the data amount of sessions that satisfy acquisition conditions" fields of the diagnosis information table 56C illustrated in FIG. 20. Specifically, the second threshold is calculated by the offline diagnosis section 46D based on the time taken to acquire the sessions SSN from the storage apparatus 70, that corresponds to the ratio of data amount of target sessions in each object OBJ. The first and second thresholds are examples of a first acquisition method criterion and a second acquisition method criterion, respectively. FIGS. 23 and 24 illustrate an operation example of the offline diagnosis section 46D.

The capture server 40 illustrated in FIG. 21 may include an online diagnosis section that calculates the threshold based on the information stored in the diagnosis information table 56D in response to an acquisition request from the management apparatus 80. The function of the online diagnosis section is the same as the function of the online diagnosis section 48B illustrated in FIG. 13 except calculating the first threshold based on the number of target sessions and calculating the second threshold based on the ratio of data amount thereof in step S200A illustrated in FIG. 17. The session acquisition section 44D illustrated in FIG. 21 includes a function of storing in the diagnosis information table 56D, information (the number of sessions, the ratio of data amount, acquisition time) concerning the sessions SSN acquired from the storage apparatus 70 based on the acquisition request from the management apparatus 80. The session acquisition section 44D includes the function of steps S304 to S320 illustrated in FIG. 17. The session acquisition section 44D stores the acquisition time in the diagnosis information table 56D in relation to the number of acquired sessions SSN and the ratio of data amount thereof in steps S310, S312, S318, and S320. Based on the instruction from the management apparatus 80, the capture server 40 selectively activates one of the offline diagnosis section 46D and the online diagnosis section to calculate the threshold.

FIG. 22 illustrates an example of the information stored in the diagnosis information table 56D illustrated in FIG. 21. The diagnosis information table 56D includes "the number of sessions that satisfy acquisition conditions" fields illustrated in the diagnosis information table 56 of FIG. 5 and "the ratio of data amount of sessions that satisfy acquisition conditions" fields illustrated in the diagnosis information table 56C of FIG. 20. The diagnosis information table 56D includes "the object-based acquisition time" fields and "the session-based acquisition time" fields corresponding to each pair of "the number of sessions" and "the ratio of data amount".

FIG. 23 illustrates an operation example of the offline diagnosis section 46D illustrated in FIG. 21. FIG. 23 illustrates an example of the data acquisition control program 62D executed by the capture server 40 illustrated in FIG. 21. Detailed description of the same or similar processes as those in FIG. 9 is omitted. The offline diagnosis section 46D executing the process in steps S102D to S112 among the process in step S100D illustrated in FIG. 23, is an example of the measurement section, and the offline diagnosis section 46D executing the process in step S200D is an example of the setting section.

First, in step S102D, the offline diagnosis section 46D uses the session information table 52 to search for sessions SSN that satisfy the acquisition conditions and calculates the number of sessions SSN, that is, the number of sessions SSN that satisfy the acquisition conditions of each object OBJ. The offline diagnosis section 46D reads the size (data amount) of the sessions SSN that satisfy the acquisition conditions from the session information table 52 (FIG. 4). The offline diagnosis section 46D reads the size (data amount) of the object OBJ including the sessions SSN that satisfy the acquisition conditions, from the object information table 54 (FIG. 4). The offline diagnosis section 46D then calculates for each object OBJ, the ratio of data amount of the sessions SSN that satisfy the acquisition conditions to the data amount of the object OBJ including the sessions SSN that satisfy the acquisition conditions.

Next, in step S104D, the offline diagnosis section 46D stores the number of sessions SSN calculated for each object OBJ and the ratio of data amount of the session SSN in the diagnosis information table 56D. The process in steps S106 to S112 executed repeatedly is the same as that of FIG. 9. The offline diagnosis section 46D acquires the sessions SSN that satisfy the acquisition conditions on an object-by-object basis and on a session-by-session basis and measures acquisition times taken to acquire the sessions SSN. The offline diagnosis section 46D then stores the measured acquisition times in the diagnosis information table 56D.

When the processes in steps S106 to S112 are completed for all the objects OBJ including the sessions SSN that satisfy the acquisition conditions, the process in step S200D is executed. In step S200D, the offline diagnosis section 46D calculates the first and second thresholds based on the information stored in the diagnosis information table 56D and stores the calculated first and second thresholds in the threshold holder 58D. FIG. 24 illustrates an example of step S200D.

FIG. 24 illustrates an example of the process in step S200D illustrated in FIG. 23. The detailed description of the same or similar processes as those of FIG. 10 is omitted. First in step S200D, the offline diagnosis section 46D executes the same process as that in step S200 illustrated in FIG. 10 to calculate the first threshold. Next, in step S202D, the offline diagnosis section 46D sets the maximum value used to calculate the second threshold, to 0 and moves the process to step S204D.

The process in steps S204D to S214 is executed for "the ratio of data amount of sessions that satisfy acquisition conditions" in each row area of the diagnosis information table 56. In step S204D, the offline diagnosis section 46D sets a temporary second threshold to "the ratio of data amount of sessions that satisfy acquisition conditions" stored in the diagnosis information table 56. Next, in step S206D, the offline diagnosis section 46D selects the method of acquiring the sessions SSN corresponding to "the ratio of data amount of sessions that satisfy acquisition conditions", based on the temporary second threshold.

Next, in step S208D, the offline diagnosis section 46D determines whether the time taken to acquire the sessions SSN with the acquisition method selected in step S206D is shorter than the time taken to acquire the sessions SSN with the unselected acquisition method. Next, in step S210D, the offline diagnosis section 46 calculates the rate (accuracy rate) of the cases where the acquisition time by the acquisition method selected in step S206D is shorter than that by the other unselected acquisition method.

Next, in step S212D, when the rate (accuracy rate) calculated in the step S210D is greater than the maximum value, the offline diagnosis section 46D moves the process to the step S214D. When the rate (accuracy rate) calculated in the step S210D is not greater than the maximum value, the offline diagnosis section 46D returns the process to the step S204D.

In step S214D, the offline diagnosis section 46D sets the temporary second threshold set in the step S204D to the maximum value and returns the process to step S204D. When the process in steps S204D to S214 is completed for each value of "the ratio of data amount of sessions that satisfy acquisition conditions" stored in the diagnosis information table 56, the process in step S216D is executed. When the process in steps S204D to S214D is executed while the temporary second threshold is set sequentially to each value of "the ratio of data amount of sessions that satisfy acquisition conditions" stored in the diagnosis information table 56D in such a manner, the temporary second threshold with the highest accuracy rate is calculated.

In step S216D, the offline diagnosis section 46D stores the maximum value, that is, the temporary second threshold with the highest accuracy rate, is stored in the threshold holder 58D as the second threshold and terminates the process.

FIG. 25 illustrates an operation example of the session acquisition section 44D illustrated in FIG. 21. FIG. 25 illustrates an example of the data acquisition control program 62D executed by the capture server 40 illustrated in FIG. 21. Detailed description of the same or similar processes as those in FIG. 12 is omitted. FIG. 25 is the same as FIG. 12 except that steps S402D and S403D are executed instead of step S402 illustrated in FIG. 12.

For each of the objects OBJ including the target sessions SSN, in step S402D, the session acquisition section 44D determines whether the number of sessions SSN to be acquired is greater than the first threshold. When the number of sessions SSN to be acquired is greater than the first threshold, the process moves to step S404. When the number of sessions SSN to be acquired is not greater than the first threshold, the process moves to step S403D.

In step S403D, for the object OBJ of interest, the session acquisition section 44D determines whether the ratio of data amount of sessions SSN to be acquired of interest is greater than the second threshold. When the ratio of data amount of sessions SSN to be acquired is greater than the second threshold, the process moves to step S404. When the ratio of data amount of sessions SSN to be acquired is not greater than the second threshold, the process moves to step S408.

When any one of the first acquisition method criterion by the first threshold and the second acquisition method criterion by the second threshold is satisfied, the session acquisition section 44D acquires the sessions SSN on an object-by-object basis. When neither of the first acquisition method criterion by the first threshold nor the second acquisition method criterion by the second threshold is satisfied, the session acquisition section 44D acquires the sessions SSN on a session-by-session basis.

FIG. 26 illustrates another operation example of the session acquisition section 44D illustrated in FIG. 21. In other words, FIG. 26 illustrates another example of the data acquisition control program 62D executed by the capture server 40 illustrated in FIG. 21. Detailed description of the same or similar processes as those in FIGS. 12 and 25 is omitted. FIG. 25 is the same as FIG. 12 except that steps S402D and S403D are executed instead of step S402 illustrated in FIG. 12. The process in steps S402D and S403D is the same as that in steps S402D and S403D illustrated in FIG. 25.

For each of the objects OBJ including the target sessions SSN, in step S402D, when the number of sessions SSN to be acquired is greater than the first threshold, the session acquisition section 44D moves the process to the step S403D. When the number of sessions SSN to be acquired is not greater than the first threshold, the session acquisition section 44D moves the process to the step S408.

In step S403D, for the object OBJ of interest, when the ratio of data amount of sessions SSN to be acquired is greater than the second threshold, the session acquisition section 44D moves the process to the step S404. When the ratio of data amount of sessions SSN to be acquired is not greater than the second threshold, the session acquisition section 44D moves the process to the step S408.

The session acquisition section 44D acquires the sessions SSN on an object-by-object basis when both the first acquisition method criterion by the first threshold and the second acquisition method criterion by the second threshold are satisfied. On the other hand, the session acquisition section 44D acquires the sessions SSN on a session-by-session basis when any one of the first acquisition method criterion by the first threshold and the second acquisition method criterion by the second threshold is not satisfied. Instead of the flow illustrated in FIGS. 25 and 26, the flow of FIG. 12 with step S402 replaced with step S402D or the flow of FIG. 12 with step S402 replaced with step S403D may be used so as to be switchable.

Hereinabove, in the embodiment illustrated in FIGS. 21 to 26, similarly to the embodiments illustrated in FIGS. 1 and 12, the acquisition method criterion is set to the threshold as an index indicating whether to acquire data that satisfy acquisition conditions on an object-by-object basis or on a session-by-session basis. Furthermore, the first threshold is set based on the temporary first threshold, and the second threshold is set based on the temporary second threshold. The first and second thresholds may be therefore statistically calculated even when the tendency of changes in acquisition time varies with respect to changes in the number of sessions.

In the embodiment illustrated in FIGS. 21 to 26, furthermore, the two thresholds are calculated based on two parameters including the number of sessions and the ratio of data amount. The method of acquiring sessions SSN is determined based on a combination of plural types of thresholds. In the process of acquiring target sessions SSN, therefore, plural types of acquisition method criterion may be selectively used.

Figure 27:
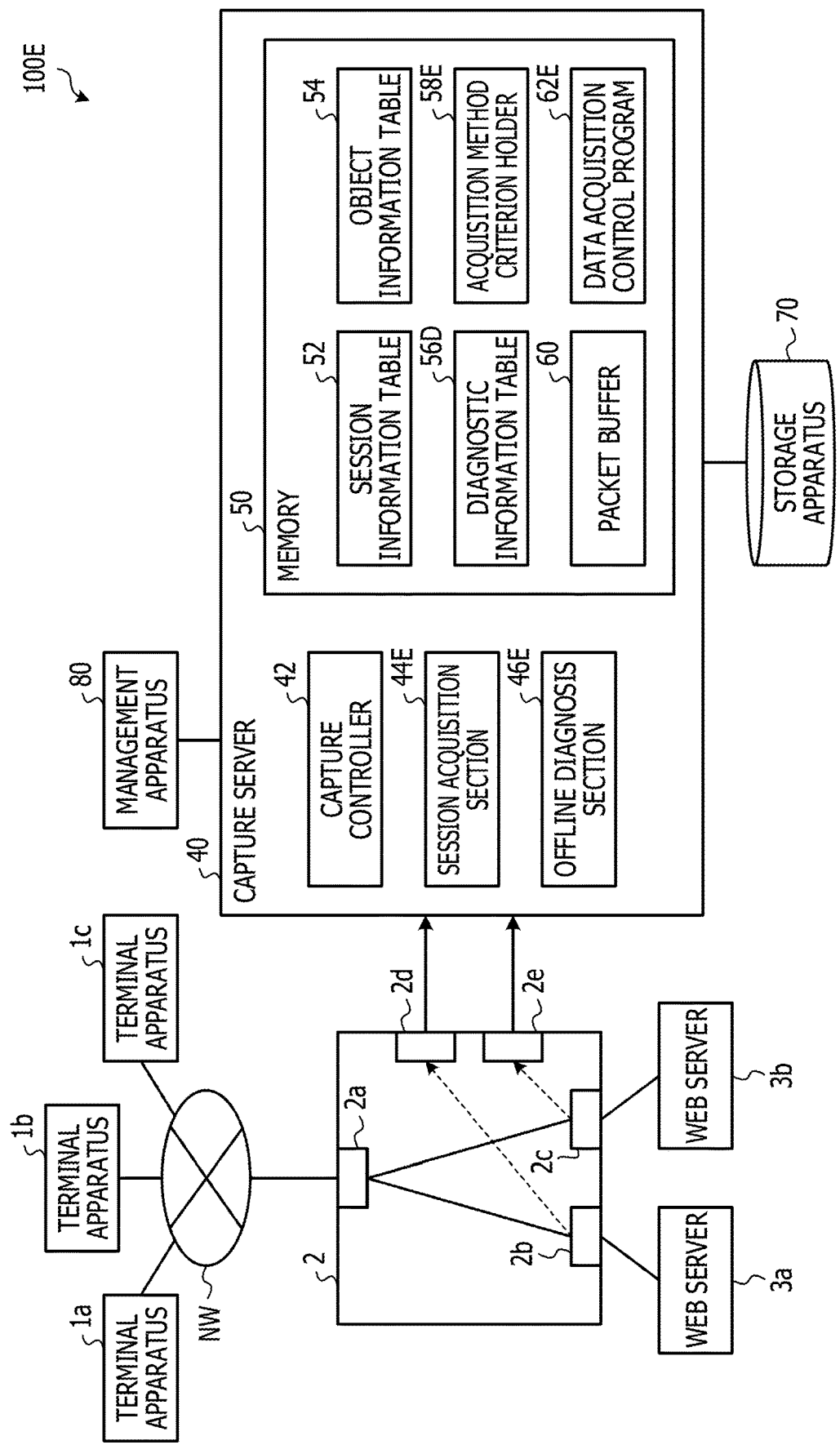
FIG. 27 is a diagram illustrating still another embodiment of the information processing apparatus, information processing system, and program.

FIG. 27 illustrates still another embodiment of the information processing apparatus, information processing system, and program. The same or similar components thereof as those of FIG. 3 or 21 are given the same reference numerals, and detailed description thereof is omitted. Similarly to the information processing system 100A illustrated in FIG. 3, an information processing system 100E illustrated in FIG. 27 includes: the capture server 40 connected to the management apparatus 80 and storage apparatus 70. The capture server 40 captures packets exchanged between the terminal apparatuses 1 and web servers 3 through the mirror ports 2d, 2e and stores the captured packets in the storage apparatus 70.

The capture server 40 includes a session acquisition section 44E instead of the session acquisition section 44 illustrated in FIG. 3 and includes an offline diagnosis section 46E instead of the offline diagnosis section 46. The capture server 40 includes the diagnosis information table 56D illustrated in FIG. 21 instead of the diagnosis information table 56 illustrated in FIG. 3 and includes an acquisition method criterion holder 58E instead of the threshold holder 58 illustrated in FIG. 3. Specifically, the capture server 40 includes the diagnosis information table 56D which includes "the object-based acquisition time" field and "the session-based acquisition time" field corresponding to each pair of "the number of sessions" and "ratio of data amount". The memory 50 of the capture server 40 stores a data acquisition control program 62E implementing the functions of the capture controller 42, session acquisition section 44E, and offline diagnosis section 46E. The functions of the capture controller 42, session acquisition section 44E, and offline diagnosis section 46E may be implemented by hardware.

Figure 29:
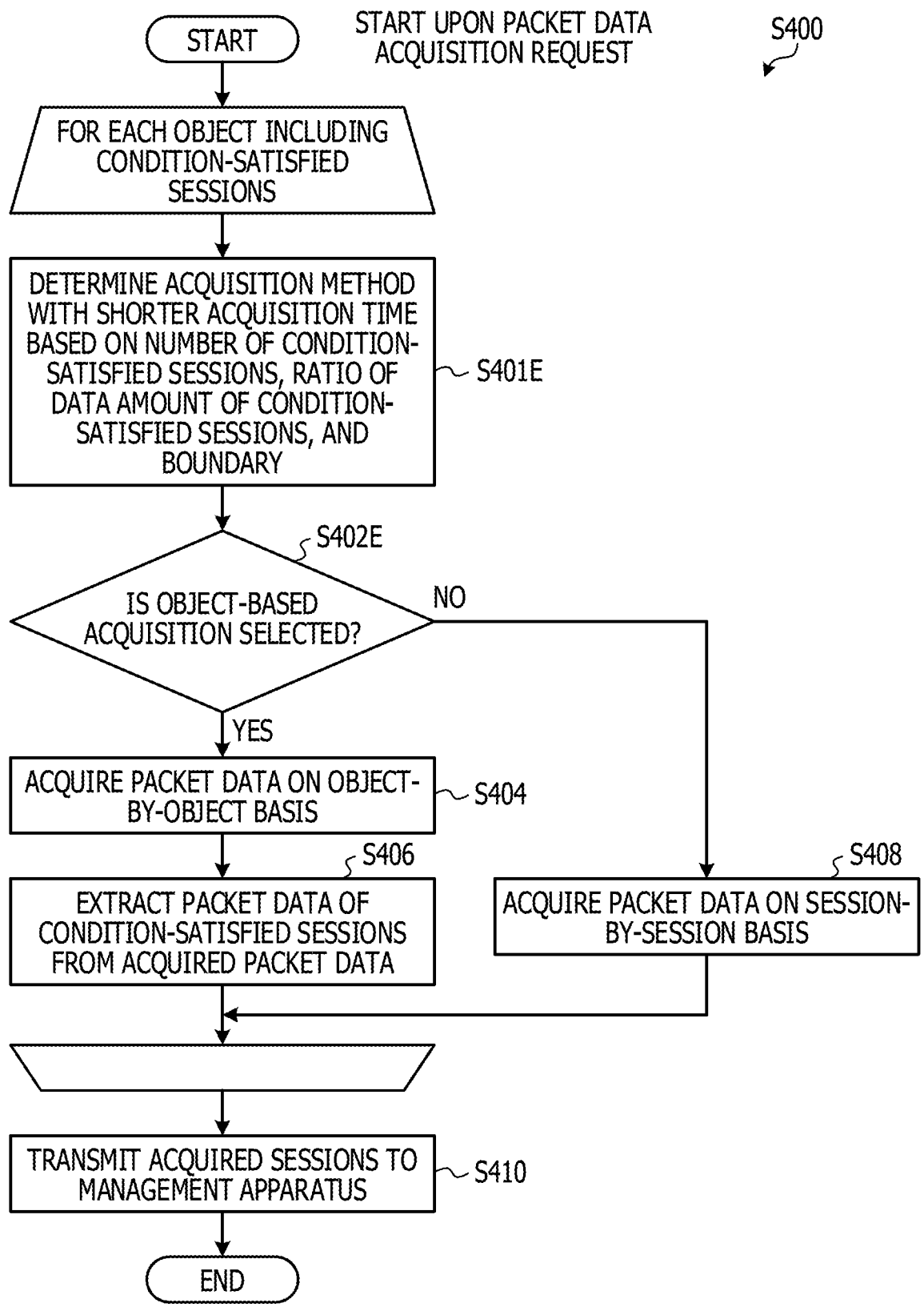
FIG. 29 is a diagram illustrating an operation example of the session acquisition section using the boundary illustrated in FIGS. 28A and 28B.

Based on the request from the management apparatus 80 to acquire sessions SSN, the session acquisition section 44E acquires the sessions SSN that satisfy the acquisition conditions included in the acquisition request, from the storage apparatus 70. Herein, for each object OBJ, the session acquisition section 44E determines the method of acquiring the target sessions SSN included in the interested object OBJ from the storage apparatus 70 based on the acquisition method criterion held in the acquisition method criterion holder 58E. The session acquisition section 44E then acquires the sessions SSN with the determined acquisition method and transmits the acquired sessions SSN to the management apparatus 80. FIG. 29 illustrates an operation example of the session acquisition section 44E. The session acquisition section 44E is an example of the acquisition section.

In a similar manner to the offline diagnosis section 46 illustrated in FIG. 3, upon a diagnosis start instruction, the offline diagnosis section 46E calculates the number of sessions SSN that satisfy the acquisition conditions for each object OBJ and stores the calculated number of sessions SSN in the diagnosis information table 56D. In a similar manner to the offline diagnosis section 46C illustrated in FIG. 19, upon a diagnosis start instruction, the offline diagnosis section 46E calculates the ratio of data amount of the sessions SSN that satisfy the acquisition conditions for each object OBJ and stores the calculated ratio of data amount in the diagnosis information table 56D.

Figure 28A:
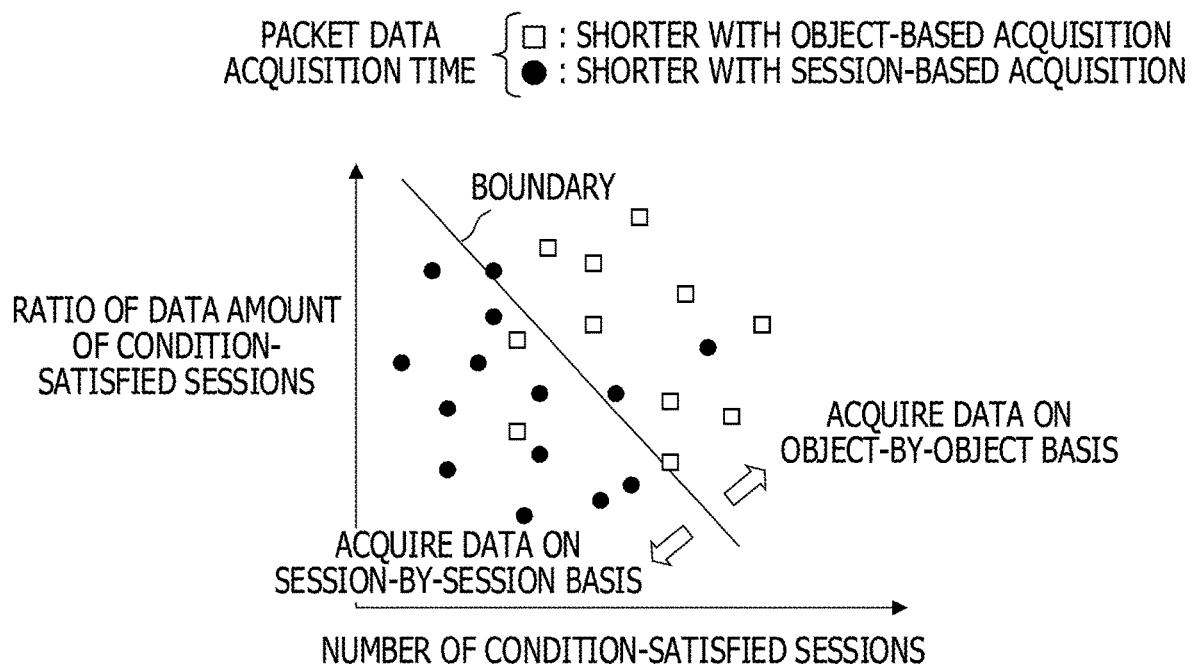
FIGS. 28A and 28B are diagrams illustrating the outline of a boundary calculated by an offline diagnosis section illustrated in FIG. 27.
Figure 28B:
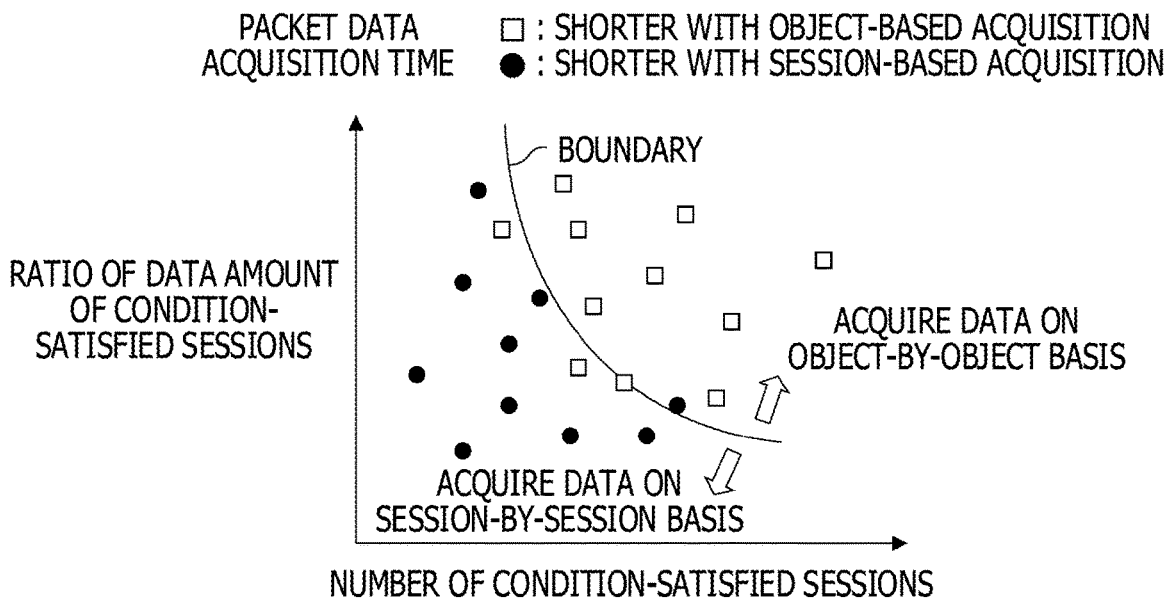

The offline diagnosis section 46E measures the time taken to acquire the sessions SSN that satisfy the acquisition conditions on an object-by-object basis and the time taken to acquire the same on a session-by-session basis and stores the measured acquisition times in the diagnosis information table 56D. Based on the information stored in the diagnosis information table 56D, the offline diagnosis section 46E calculates the acquisition method criterion as: the coefficients or the like of a determination expression that indicates the boundary (separation line) to determine the method of acquiring sessions SSN in a two-dimensional distribution of the number of sessions and the ratio of data amount. The offline diagnosis section 46E stores the acquisition method criterion indicating the calculated boundary in the acquisition method criterion holder 58E. FIGS. 28A and 28B illustrate an example of the boundary calculated by the offline diagnosis section 46E. The offline diagnosis section 46E measuring the times taken to acquire target sessions SSN on an object-by-object basis and on a session-by-session basis is an example of the measurement section. The offline diagnosis section 46E calculating the information including the coefficients of the determination expression indicating the boundary and storing the calculated information as the acquisition method criterion in the acquisition method criterion holder 58E is an example of the setting section.

The capture server 40 illustrated in FIG. 27 may include an online diagnosis section which calculates the threshold value based on the information stored in the diagnosis information table 56D in response to an acquisition request from the management apparatus 80. The function of the online diagnosis section is the same as that of the online diagnosis section 48B illustrated in FIG. 13 except that the first and second thresholds are calculated based on the number of sessions and the ratio of data amount in step S200A illustrated in FIG. 17, respectively. The session acquisition section 44E illustrated in FIG. 27 includes a function of storing in the diagnosis information table 56D, information (the number of sessions, the ratio of data amount, and the acquisition time) concerning the sessions SSN acquired from the storage apparatus 70 based on the acquisition request from the management apparatus 80. The session acquisition section 44E includes the function in steps S304 to S320 illustrated in FIG. 17. The session acquisition section 44E however stores the acquisition time in the diagnosis information table 56D, in relation to the number of acquired sessions SSN and the ratio of data amount thereof, in steps S310, S312, S318, and S320. The capture server 40 selectively activates one of the offline diagnosis section 46E and online diagnosis section based on the instruction from the management apparatus 80 to calculate the thresholds.

FIGS. 28A and 28B illustrate the outline of the boundary calculated in the offline diagnosis section 46E illustrated in FIG. 27. FIG. 28A illustrates a case where the boundary (separation line) is a straight line, and FIG. 28B illustrates a case where the boundary (separation line) is a curve.

In FIG. 28A, the offline diagnosis section 46E refers to the information stored in the diagnosis information table 56D illustrated in FIG. 22. The offline diagnosis section 46E associates a two-dimensional distribution of the number of sessions SSN that satisfy the acquisition conditions and the ratio of data amount thereof with the acquisition time of the same. This produces a two-dimensional distribution of "the cases where the object-based acquisition time is shorter than the session-based acquisition time" (white squares) and "the cases where the object-based acquisition time is not shorter than the session-based acquisition time" (black circles). Based on the produced distribution, the offline diagnosis section 46E calculates information including the coefficients of the determination expression indicating the boundary to determine which is the shorter among the object-based acquisition times and the session-based acquisition time when the number of target sessions and the ratio of data amount thereof are given. In FIG. 28B, the offline diagnosis section 46E calculates information including the coefficients of the determination expression indicating the boundary in a similar manner to FIG. 28A except that the boundary is a curve.

The session acquisition section 44E acquires the sessions SSN with the acquisition method determined based on the number of sessions and the ratio of data amount using the boundary illustrated in FIG. 28A or 28B. When the number of target sessions and the ratio of data amount thereof are included above and to the right of the boundary, the session acquisition section 44E selects the object-based acquisition method. When the number of target sessions SSN and the ratio of data amount thereof are included below and to the left of the boundary, the session acquisition section 44E selects the session-based acquisition method. Using the boundary increases the likelihood of selecting the acquisition method with shorter acquisition time, compared with using the threshold.

For example, the offline diagnosis section 46E calculates the coefficients or the like of the determination expression indicating the boundary based on the number of target sessions and the ratio of data amount thereof by using a neural network. The acquisition method criterion calculated by the offline diagnosis section 46E is not limited to the coefficients or the like of the determination expression and may be determined using a decision tree method, a logistic regression method, or the like, for example.

In a decision tree method, the offline diagnosis section 46E sets the number of target sessions and the ratio of data amount thereof as independent variables and calculates dependent variables indicating whether to acquire the sessions SSN on an object-by-object basis for each pair of independent variables, thus generating a decision tree. In a logistic regression method, the offline diagnosis section 46E sets the number of target sessions and the ratio of data amount thereof as explanatory variables and calculates an objective variable indicating whether to acquire the sessions SSN on an object-by-object basis for each pair of explanatory variables, thus generating a relational expression. The session acquisition section 44E applies the number of sessions SSN of each object OBJ that satisfy the acquisition conditions included in the acquisition request from the management apparatus 80 and the ratio of data amount thereof to the decision tree or the relational expression of the logistic regression method. The session acquisition section 44E determines the method of acquiring sessions SSN based on the decision tree or logistic regression relational expression and acquires the sessions SSN.

FIG. 29 is an operation example of the session acquisition section 44E using the boundary illustrated in FIG. 28. In other words, FIG. 29 illustrates an example of the data acquisition control program 62E executed by the capture server 40 illustrated in FIG. 27. Detailed description of the same or similar processes as those in FIG. 12 is omitted. FIG. 29 is the same as FIG. 12 except that step S402E is executed instead of step S402 illustrated in FIG. 12 and step S401E is executed before step S402E. Steps S401E to S408 are executed for each of the objects OBJ including sessions SSN that satisfy the acquisition conditions included in the acquisition request.

In step S401E, the session acquisition section 44E determines the acquisition method with the shorter acquisition time based on the position on the two-dimensional distribution of the number of target sessions SSN that satisfy acquisition conditions and the ratio of data amount thereof and the positional relationship with the boundary. Next, in step S402E, when selecting the object-based acquisition method, the session acquisition section 44E moves the process to step S404. When selecting the session-based acquisition method, the session acquisition section 44E moves the process to step S408.

In the embodiment illustrated in FIGS. 27 to 29, similarly to the embodiments illustrated in FIGS. 1 to 12, the acquisition method criterion as an index indicating whether to acquire data that satisfy acquisition conditions on an object-by-object basis or on a session-by-session basis may be set. Furthermore, in the embodiment illustrated in FIGS. 27 to 29, the method of acquiring sessions SSN is determined using the boundary drawn on the two-dimensional distribution of the number of target sessions and the ratio of data amount. This increases the likelihood of selecting the acquisition method with shorter acquisition time compared with the case where the acquisition method is determined based on the threshold.

Figure 30:
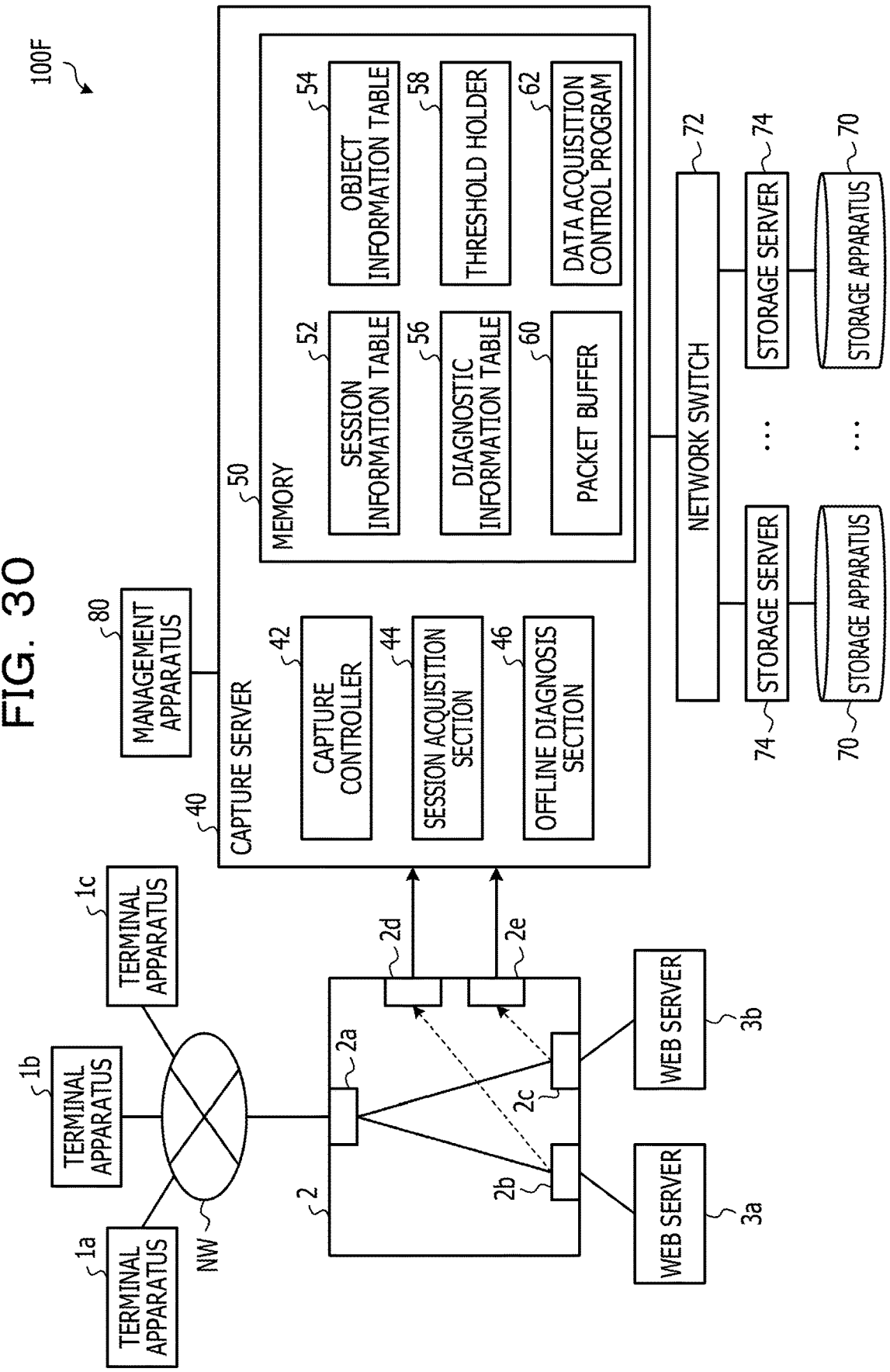
FIG. 30 is a diagram illustrating still another embodiment of the information processing apparatus, information processing system, and program.

FIG. 30 illustrates still another embodiment of the information processing apparatus, information processing system, and program. An information processing system 100F illustrated in FIG. 30 includes: plural storage servers 74 connected to the capture server 40 through a network switch 72 and the storage apparatus 70 connected to each of the 74. When the network flow rate between the terminal apparatuses 1 and web servers 3 is higher than that in FIG. 3, the capture server 40 desirably store the captured packets in the plural storage apparatuses 70 in parallel as illustrated in FIG. 30 so as not to lose the captured packets. In a similar manner to the capture servers 40 illustrated in FIG. 30, the capture servers 40 illustrated in FIGS. 13, 19, 21, and 27 may be connected to the plural storage apparatuses 70 through the network switch 72 and storage server 74.

Figure 31:
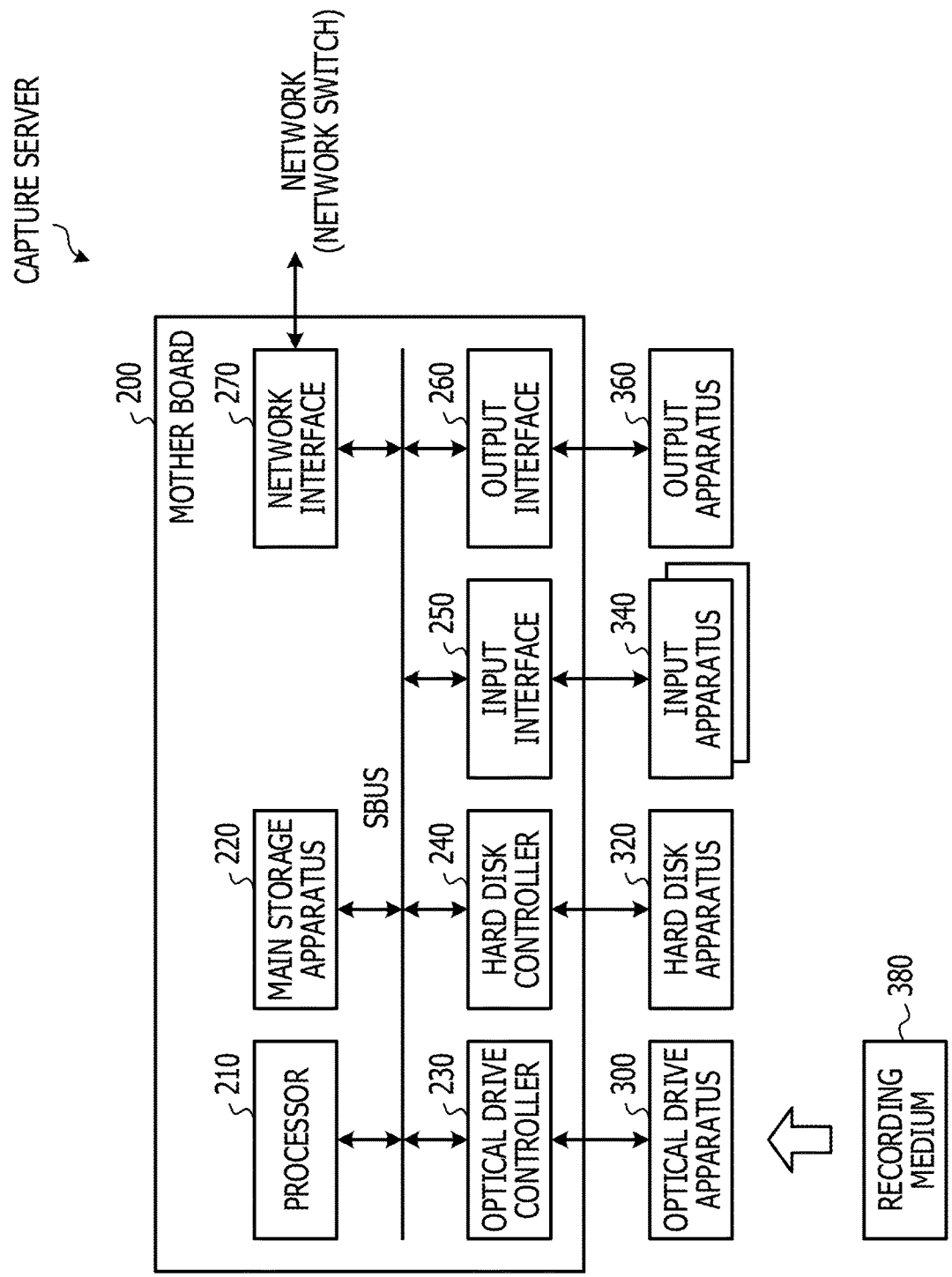
FIG. 31 is a diagram illustrating an example of the hardware configuration of the capture servers illustrated in FIGS. 1, 3, 13, 19, 21, 27, and 30.

FIG. 31 illustrates an example of the hardware configuration of the capture servers 40 illustrated in FIGS. 1, 3, 13, 19, 21, 27, and 30. The capture server 40 includes a mother board 200, an optical drive apparatus 300, a hard disk apparatus 320, an input apparatus 340, an output apparatus 360, and the like. On the mother board 200, various components are mounted, including a processor 210, a main storage apparatus 220, an optical drive controller 230, a hard disk controller 240, an input interface 250, an output interface 260, and a network interface 270. For example, the processor 210 is a central processing unit (CPU) or a graphics processing unit (GPU). The processor 210, main storage apparatus 220, optical drive controller 230, hard disk controller 240, input interface 250, output interface 260, and network interface 270 are connected to a system bus SBUS. The main storage apparatus 220 corresponds to the memory 14 illustrated in FIG. 1 and the memory 50 illustrated in FIG. 3 and the like. The processor 210, optical drive controller 230, hard disk controller 240, input interface 250, output interface 260, and a network interface 270 may be included in a same semiconductor chip.

The processor 210 executes the program (the program 17 stored in the storage area illustrated in FIG. 1, the data acquisition control program 62 illustrated in FIG. 3, and the like) stored in the main storage apparatus 220 to implement the functions of the capture server 40.

The optical drive controller 230 is connected to the optical drive apparatus 300 and is able to access a recording medium 380 loaded in the optical drive apparatus 300. The recording medium 380 is a Compact Disc (CD, registered trademark), a digital versatile disc (DVD, registered trademark), or the like and stores programs to be executed by the processor 210, for example. The programs executed by the processor 210 and the like are downloaded from the recording medium 380 to the hard disk apparatus 320 through the optical drive apparatus 300 and is transferred to the main storage apparatus 220. The processor 210 may download programs from the recording medium 380 to the main storage apparatus 220 not through the hard disk apparatus 320.

The hard disk controller 240 is connected to the hard disk apparatus 320. When the power supply to the capture server 40 is turned on, for example, the processor 210 transfers the program stored in the hard disk apparatus 320 to the main storage apparatus 220 and executes the program transferred to the main storage apparatus 220 to operate.

The input interface 250 is connected to the input apparatus 340, including a keyboard and a mouse. The output interface 260 is connected to the output apparatus 360, including a display and a printer. The network interface 270 270 is connected to the network switch 2 illustrated in FIG. 3 and the like. The processor 210 may download a program stored in an apparatus on a network connected through the network switch 2 or the like, to the hard disk apparatus 320 or the main storage apparatus 220 via the network.

The following Notes are disclosed concerning the embodiments illustrated in FIGS. 1 to 31 described above.

(Note 1)

An information processing apparatus which acquires data from a storage apparatus storing an object including data which is contained in a predetermined number of sessions, the apparatus comprising:

a measurement section configured to, for each acquisition condition, measure an acquisition time taken to acquire target data that satisfy the acquisition condition, from the storage apparatus on an object-by-object basis and an acquisition time taken to acquire the target data from the storage apparatus on a session-by-session basis; and a setting section configured to, based on the acquisition times measured by the measurement section, set an acquisition method criterion to determine whether to acquire from the storage apparatus, data that satisfy the acquisition condition included in a data acquisition request with an object-based acquisition method, that is an acquisition method of acquiring the data on an object-by-object basis, or with a session-based acquisition method, that is an acquisition method of acquiring the data on a session-by-session basis.

(Note 2)

The information processing apparatus according to note 1, wherein the setting section sets the acquisition method criterion to a first number of sessions, which is the number of sessions that contain the target data included in an object, as a threshold used to determine whether to acquire data that satisfy the acquisition condition included in the data acquisition request, with the object-based acquisition method or with the session-based acquisition method.

(Note 3)

The information processing apparatus according to note 2, wherein the setting section based on the acquisition times measured by the measurement section, specifies an acquisition method with the shorter acquisition time among the object-based and session-based acquisition methods, for each of a plurality of the first numbers of sessions, sets each of the first numbers of sessions as a temporary acquisition method criterion and determines for each of the first numbers of sessions whether the acquisition method determined based on the temporary acquisition method criterion agrees with the specified acquisition method, and sets the threshold to one of the first numbers of sessions for which the acquisition method determined based on the temporary acquisition method criterion agrees with the specified acquisition method at the highest rate.

(Note 4)

The information processing apparatus according to note 1, wherein the setting section sets the acquisition method criterion to the ratio of the target data in an object as a threshold used to determine whether to acquire the data with the object-based acquisition method or with the session-based acquisition method.

(Note 5)

The information processing apparatus according to any one of notes 1 to 4, further comprising:

an acquisition section configured to search for objects including the target data based on an acquisition request including the acquisition condition and for each of the objects found by the search, acquire data from the storage apparatus with the object-based acquisition method or with the session-based acquisition method based on the acquisition method criterion.

(Note 6)

The information processing apparatus according to note 1, wherein the setting section sets the acquisition method criterion to a first number of sessions, which is the number of sessions that contain the target data included in an object, as a first threshold used to determine whether to acquire the target data with the object-based acquisition method or with the session-based acquisition method and sets the acquisition method criterion to a ratio of the target data in the object as a second threshold used to determine whether to acquire the target data with the object-based acquisition method or with the session-based acquisition method, the apparatus further comprising:

an acquisition section configured to search for objects including the target data based on the acquisition condition and for each the objects found by the search, acquire data from the storage apparatus with the object-based acquisition method or with the session-based acquisition method based on the first and second thresholds.

(Note 7)

The information processing apparatus according to note 6, wherein the acquisition section determines to acquire the target data from the storage apparatus with the object-based method when the number of sessions that contain the target data included in the object is greater than the first threshold or the ratio of the target data in the object is greater than the second threshold.

(Note 8)

The information processing apparatus according to note 6, wherein the acquisition section determines to acquire the target data from the storage apparatus with the object-based method when the number of sessions that contain the target data included in the object is greater than the first threshold and the ratio of the target data in the object is greater than the second threshold.

(Note 9)

The information processing apparatus according to any one of notes 5 to 8, wherein until the setting section sets the acquisition method criterion, the acquisition section performs the object-based acquisition method and the session-based acquisition method with an identical frequency, the measurement section measures acquisition time taken for the acquisition section to acquire data, the setting section sets the acquisition method criterion based on the acquisition time measured by the measurement section after a predetermined number of acquisitions of data, and after the acquisition method criterion is set, the acquisition section acquires data from the storage apparatus with one of the object-based acquisition method and the session-based acquisition method based on the acquisition method criterion.

(Note 10)

The information processing apparatus according to note 9, wherein after the acquisition method criterion is set, the acquisition section acquires data at a predetermined frequency with the other method than the method determined based on the acquisition method criterion, and after the acquisition method criterion is set, the setting section updates the acquisition method criterion based on the acquisition times measured by the measurement section every predetermined number of acquisitions of data.

(Note 11)

The information processing apparatus according to note 1, wherein based on a pair of the first number of sessions, which is the number of sessions that contain the target data included in an object, and a ratio of the target data in the object and the acquisition times which are taken to acquire the target data on an object-by-object basis and on an session-by-session basis and are measured by the measurement section corresponding to the pair, the setting section sets the acquisition method criterion to information indicating a boundary to determine whether to acquire data that satisfy the acquisition condition with the object-based or session-based acquisition method in a two-dimensional distribution of the first number of sessions and the ratio of data, the information processing apparatus further comprising:

an acquisition section configured to search for objects including the target data based on an acquisition request including the acquisition condition and for each of the objects found by the search, acquire data that satisfy the acquisition condition from the storage apparatus with the object-based acquisition method or on the session-based acquisition method based on the positional relationship on the two-dimensional distribution between the boundary and the position specified by the first number of sessions and the ratio of data.

(Note 12)

The information processing apparatus according to any one of notes 1 to 11, further comprising:

a capture controller configured to capture data transmitted between other information processing apparatuses, classify the captured data into an object including data which are contained in a predetermined number of sessions, and store the same data in the storage apparatus.

(Note 13)

An information processing system, comprising a first information processing apparatus which acquires data from a storage apparatus storing an object including data that is contained in a predetermined number of sessions; and a second information processing apparatus which issues an acquisition request including acquisition conditions to the first information processing apparatus, wherein the first information processing apparatus includes:

a measurement section configured to, for each acquisition condition, measure an acquisition time taken to acquire target data that satisfy the acquisition condition, from the storage apparatus on an object-by-object basis and an acquisition time taken to acquire the target data from the storage apparatus on a session-by-session basis; and a setting section configured to, based on the acquisition times measured by the measurement section, set an acquisition method criterion to determine whether to acquire from the storage apparatus, data that satisfy the acquisition condition included in a data acquisition request on an object-by-object basis or on a session-by-session basis.

(Note 14)

A program causing an information processing apparatus, which acquires data from a storage apparatus storing an object including data that is contained in a predetermined number of sessions, to for each acquisition condition, measure an acquisition time that is taken to acquire target data that satisfy the acquisition condition from the storage apparatus on an object-by-object basis and an acquisition time that is taken to acquire the target data from the storage apparatus on a session-by-session basis; and based on the measured acquisition times, set an acquisition method criterion to determine whether to acquire from the storage apparatus, data that satisfy the acquisition condition included in a data acquisition request, on an object-by-object basis or a session-by-session basis.

(Note 15)

A recording medium including a program causing an information processing apparatus, which acquires data from a storage apparatus storing an object including data that is contained in a predetermined number of sessions, to for each acquisition condition, measure an acquisition time that is taken to acquire target data that satisfy the acquisition condition, from the storage apparatus on an object-by-object basis and an acquisition time that is taken to acquire the target data from the storage apparatus on a session-by-session basis; and based on the measured acquisition times, set an acquisition method criterion to determine whether to acquire from the storage apparatus, data that satisfy the acquisition condition included in a data acquisition request, on an object-by-object basis or a session-by-session basis.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus coupled to a storage device that stores object data including pieces of data each of which corresponds to any one of a plurality of sessions, the information processing apparatus comprising:
    a memory; and
    a processor coupled to the memory and the processor configured to execute a process, the process including:
        measuring a first acquisition time to acquire data that satisfy an acquisition condition from the storage device on an object-by-object basis;
        measuring a second acquisition time to acquire the data that satisfy the acquisition condition from the storage device on a session-by-session basis;
        determining whether to acquire, from the storage device, the data that satisfy the acquisition condition with an object-based acquisition that acquire the data on the object-by-object basis, or with a session-based acquisition that acquire the data on the session-by-session basis based on the first acquisition time and the second acquisition time; and
        upon a reception of a data acquisition request including the acquisition condition, acquiring the data that satisfy the acquisition condition from the storage device in accordance with a result of the determining.

2. The information processing apparatus according to claim 1, wherein
    the measuring the first acquisition time and the measuring the second acquisition time are performed for a plurality of situations with different numbers of the sessions; and
    the determining determines, for each of the plurality of situations, whether to acquire the data with the object-based acquisition or with the session-based acquisition.

3. The information processing apparatus according to claim 2, wherein
    the process further includes:
        determining a threshold of a number of the sessions to switch between the object-based acquisition and the session-based acquisition; and wherein
    the acquiring the data switches between the object-based acquisition and the session-based acquisition based on the determined threshold.

4. The information processing apparatus according to claim 1, wherein the determining whether to acquire the data determines whether to acquire the data with the object-based acquisition or with the session-based acquisition based on a ratio of the data that satisfy the acquisition condition in the object data.

5. The information processing apparatus according to claim 1, wherein
the process further includes:
searching for pieces of object data including the data that satisfy the acquisition condition based on the data acquisition request; and
determining, for each of the pieces of object data, whether to acquire the data that satisfy the acquisition condition with the object-based acquisition or with the session-based acquisition.

6. The information processing apparatus according to claim 5, wherein
a threshold of a number of the sessions to switch between the object-based acquisition and the session-based acquisition is determined for each of the pieces of object data.

7. The information processing apparatus according to claim 5, wherein
a threshold of the ratio of the data that satisfy the acquisition condition to switch between the object-based acquisition and the session-based acquisition is determined for each of the pieces of object data.

8. The information processing apparatus according to claim 5, wherein
performing the object-based acquisition and the session-based acquisition with an identical frequency;
measuring each of the first acquisition time and the second acquisition time more than once;
determining whether to acquire the data that satisfy the acquisition condition with an object-based acquisition or with a session-based acquisition based on the first acquisition time and the second acquisition time measured more than once.

9. The information processing apparatus according to claim 8, wherein
setting acquisition method criterion indicating whether to acquire the data with an object-based acquisition or with a session-based acquisition based on the first acquisition time and the second acquisition time measured more than once;
after the acquisition method criterion is set, acquiring the data at a predetermined frequency with another method that is not indicated by the acquisition method criterion, and
after the acquisition method criterion is set, updating the acquisition method criterion based on acquisition times of the acquiring the data at a predetermined frequency with the another method.

10. The information processing apparatus according to claim 1, wherein
based on a pair of a number of sessions that contain the data included in the object data, and a ratio of the data in the object data, the first acquisition time corresponding to the pair and the second acquisition time corresponding to the pair, setting the acquisition method criterion indicating a boundary to switch between the object-based acquisition and session-based acquisition, the boundary being in a two-dimensional distribution of the number of sessions and the ratio of the data;
determining whether to acquire data that satisfy the acquisition condition based on the positional relationship on the two-dimensional distribution between the boundary and the position specified by a number of sessions and a ratio of data of the object data from which the data that satisfy the acquisition condition is acquired.

11. An information processing system comprising;
a first computer including
a memory; and
a processor coupled to the memory; and
a second computer that transmits an acquisition request including an acquisition condition to the first computer;
wherein
the processor is configured to execute a process, the process including:
measuring a first acquisition time to acquire data that satisfy the acquisition condition from the storage device on an object-by-object basis;
measuring a second acquisition time to acquire the data that satisfy the acquisition condition from the storage device on a session-by-session basis;
determining whether to acquire, from the storage device, the data that satisfy the acquisition condition with an object-based acquisition that acquire the data on the object-by-object basis, or with a session-based acquisition that acquire the data on the session-by-session basis based on the first acquisition time and the second acquisition time; and
upon a reception of a data acquisition request including the acquisition condition, acquiring the data that satisfy the acquisition condition from the storage device in accordance with a result of the determining.

12. A non-transitory computer-readable storage medium storing a program that causes a computer to execute a process, the process comprising:
measuring a first acquisition time to acquire data that satisfy an acquisition condition from a storage device that stores object data including pieces of data, on an object-by-object basis;
measuring a second acquisition time to acquire the data that satisfy the acquisition condition from the storage device on a session-by-session basis;
determining whether to acquire, from the storage device, the data that satisfy the acquisition condition with an object-based acquisition that acquire the data on the object-by-object basis, or with a session-based acquisition that acquire the data on the session-by-session basis based on the first acquisition time and the second acquisition time; and
upon a reception of a data acquisition request including the acquisition condition, acquiring the data that satisfy the acquisition condition from the storage device in accordance with a result of the determining.

* * * * *